(12) United States Patent
Suga

(10) Patent No.: US 9,143,223 B2
(45) Date of Patent: Sep. 22, 2015

(54) RELAY STATION, BASE STATION, AND RADIO COMMUNICATION METHOD

(75) Inventor: Junichi Suga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 134 days.

(21) Appl. No.: 13/446,893

(22) Filed: Apr. 13, 2012

(65) Prior Publication Data

US 2012/0195252 A1 Aug. 2, 2012

Related U.S. Application Data

(63) Continuation of application No. PCT/JP2009/068403, filed on Oct. 27, 2009.

(51) Int. Cl.
*H04B 7/14* (2006.01)
*H04B 7/155* (2006.01)

(52) U.S. Cl.
CPC ................... *H04B 7/15528* (2013.01)

(58) Field of Classification Search
CPC .................................... H04B 7/15528
USPC ........................................ 370/315
See application file for complete search history.

(56) References Cited

U.S. PATENT DOCUMENTS

| | | | |
|---|---|---|---|
| 6,240,092 B1 * | 5/2001 | Monch | 370/408 |
| 8,014,325 B2 * | 9/2011 | Izumikawa et al. | 370/310 |
| 8,340,029 B2 * | 12/2012 | Chion et al. | 370/329 |
| 8,437,286 B2 * | 5/2013 | Cai et al. | 370/315 |
| 2005/0041573 A1 * | 2/2005 | Eom et al. | 370/208 |
| 2005/0049013 A1 * | 3/2005 | Chang et al. | 455/574 |
| 2006/0148507 A1 | 7/2006 | Liljestrom et al. | |
| 2007/0097945 A1 * | 5/2007 | Wang et al. | 370/349 |
| 2007/0147341 A1 * | 6/2007 | Izumikawa et al. | 370/351 |
| 2007/0162457 A1 * | 7/2007 | Barcia et al. | 707/10 |

(Continued)

FOREIGN PATENT DOCUMENTS

| | | |
|---|---|---|
| JP | 2005-184522 | 7/2005 |
| JP | 2005184522 | 7/2005 |

(Continued)

OTHER PUBLICATIONS

Office Action issued for corresponding Japanese Patent Application No. 2011-538138, issued Jul. 2, 2013, with partial English translation.

(Continued)

*Primary Examiner* — Guang Li
(74) *Attorney, Agent, or Firm* — Myers Wolin, LLC

(57) ABSTRACT

In a radio communication system including a relay station and a base station, the relay station transfers data from each mobile station to the base station based on a correspondence selected according to a frame from among different correspondences between identification information for a mobile station and timing in a frame at which data from the mobile station is transmitted. The base station identifies the data from each mobile station included in the frame received from the relay station based on the correspondence selected according to the frame. This radio communication method can be applied to data transmission from the base station to the relay station.

12 Claims, 29 Drawing Sheets

181

| STID | DL INTERVAL | UL INTERVAL | UL OFFSET | DL OFFSET | GROUP ID |
|---|---|---|---|---|---|
| MS#1 | 16 | 16 | 2 | 15 | 1 |
| MS#2 | 16 | 16 | 2 | 15 | 1 |
| MS#3 | 16 | 16 | 2 | 15 | 1 |
| MS#4 | 16 | 16 | 2 | 15 | 1 |
| MS#5 | 16 | 16 | 10 | 7 | 2 |
| MS#6 | 16 | 16 | 10 | 7 | 2 |
| ⋮ | ⋮ | ⋮ | ⋮ | ⋮ | ⋮ |

(56) References Cited

U.S. PATENT DOCUMENTS

| | | | |
|---|---|---|---|
| 2007/0249347 A1* | 10/2007 | Saifullah et al. | 455/436 |
| 2007/0270096 A1* | 11/2007 | Nozaki | 455/7 |
| 2008/0062904 A1* | 3/2008 | Tzu-Ming | 370/312 |
| 2008/0070614 A1* | 3/2008 | Ogushi et al. | 455/522 |
| 2008/0095181 A1* | 4/2008 | Suetsugu et al. | 370/412 |
| 2008/0101369 A1* | 5/2008 | Sandoz et al. | 370/392 |
| 2008/0108303 A1 | 5/2008 | Okuda | |
| 2008/0285501 A1* | 11/2008 | Zhang et al. | 370/315 |
| 2009/0053994 A1* | 2/2009 | Senarath et al. | 455/11.1 |
| 2009/0059887 A1* | 3/2009 | Pekonen et al. | 370/345 |
| 2009/0073915 A1* | 3/2009 | Zhang et al. | 370/315 |
| 2009/0209199 A1* | 8/2009 | Suga | 455/7 |
| 2009/0303953 A1* | 12/2009 | Kang et al. | 370/329 |
| 2010/0110964 A1* | 5/2010 | Love et al. | 370/312 |

FOREIGN PATENT DOCUMENTS

| | | |
|---|---|---|
| JP | 2007006199 | 11/2007 |
| JP | 2008118500 | 5/2008 |
| JP | 2008278341 | 11/2008 |
| JP | 2009094896 | 4/2009 |
| WO | 2006072665 | 7/2006 |

OTHER PUBLICATIONS

International Search Report issued for Japanese Patent Application No. PCT/JP2009/068403 mailed Jan. 26, 2010.

IEEE Computer Society; IEEE Std 802.16j; IEEE Standard for Local and metropolitan area networks; "Part 16: Air Interface for Broadband Wireless Access Systems"; Amendment 1: Multihop Relay Specification; New York, NY; Jun. 12, 2009.

IEEE Computer Society; IEEE Std 802.16-2004 (Revision of IEEE Std 802.16-2001); IEEE Standard for Local and metropolitan area networks; "Part 16: Air Interface for Fixed Broadband Wireless Access Systems"; New York, NY; Oct. 1, 2004.

IEEE Computer Society; IEEE Std 802.16e-2005 and IEEE Std 802.16-2004/Cor1-2005 (Amendment and Corrigendum to IEEE Std 802.16-2004); IEEE Standard for Local and metropolitan area networks; "Part 16: Air Interface for Fixed and Mobile Broadband Wireless Access Systems"; Amendment 2: Physical and Medium Access Control Layers for Combined Fixed and Mobile Operation in Licensed Bands; New York, NY; Feb. 28, 2006.

LG Electronics; IEEE 802.16 Presentation Submission Template (Rev. 9); "Relay addressing method in IEEE 802.16m"; Document No. IEEE C80216m-09/0438r1; Feb. 27, 2009.

* cited by examiner

FIG. 7

| STID | DL INTERVAL | UL INTERVAL | UL OFFSET | DL OFFSET | GROUP ID |
|---|---|---|---|---|---|
| MS#1 | 16 | 16 | 2 | 15 | 1 |
| MS#2 | 16 | 16 | 2 | 15 | 1 |
| MS#3 | 16 | 16 | 2 | 15 | 1 |
| MS#4 | 16 | 16 | 2 | 15 | 1 |
| MS#5 | 16 | 16 | 10 | 7 | 2 |
| MS#6 | 16 | 16 | 10 | 7 | 2 |
| ⋮ | ⋮ | ⋮ | ⋮ | ⋮ | ⋮ |

FIG. 14

| Type | MEANING OF VALUE |
|---|---|
| 1 | Service Flow ID |
| 9 | MINIMUM RESERVED TRAFFIC RATE |
| 11 | UPLINK GRANT SCHEDULING TYPE |
| 14 | MAXIMUM LATENCY |
| 29 | DATA DELIVERY SERVICE TYPE |
| ⋮ | ⋮ |

FIG. 17

| Relay-Persistent_DL_HARQ_MAP_IE | |
|---|---|
| RS STID | variable |
| Length | variable |
| Group ID | 5 bit |
| MODULATION AND CODING SCHEME | 4 bit |
| NUMBER OF ALLOCATED MSES (N) | 3 bit |
| MS STID [n] | 12 × n bit |
| NUMBER OF DE-ALLOCATED MSES (M) | 3 bit |
| MS STID [m] | 12 × m bit |
| Subchannel Offset | 7 bit |
| NUMBER OF SUBCHANNELS | 7 bit |

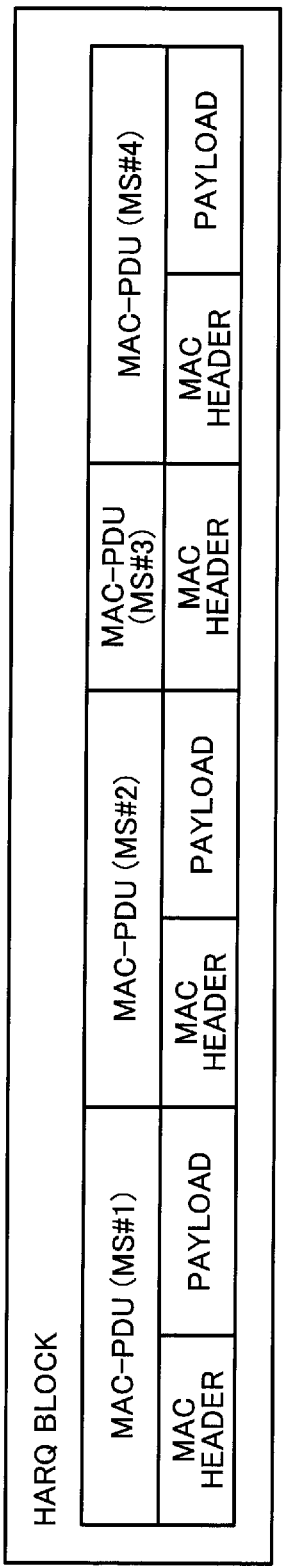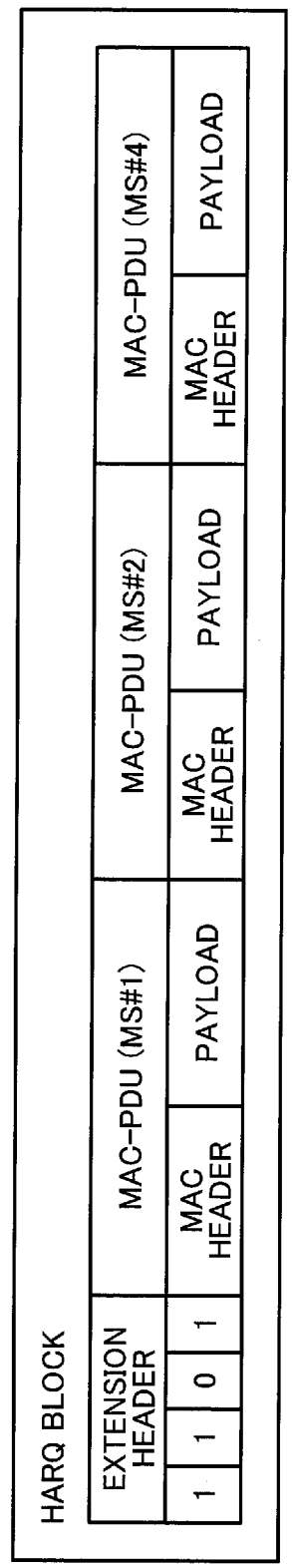

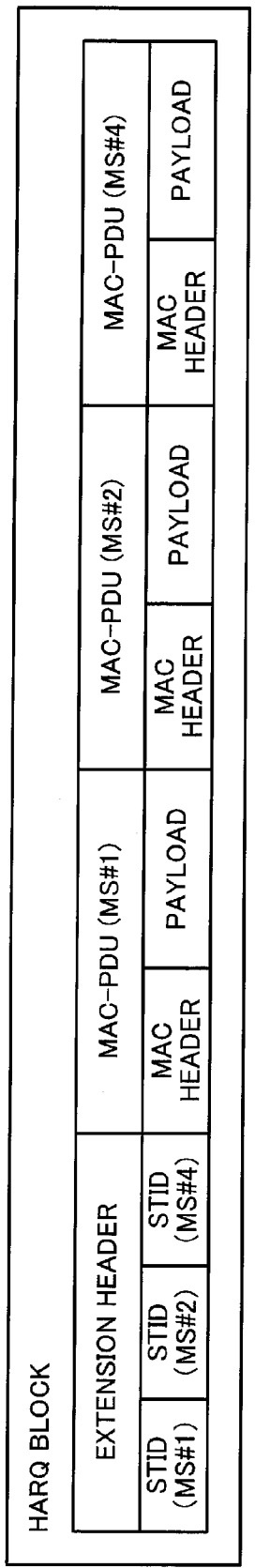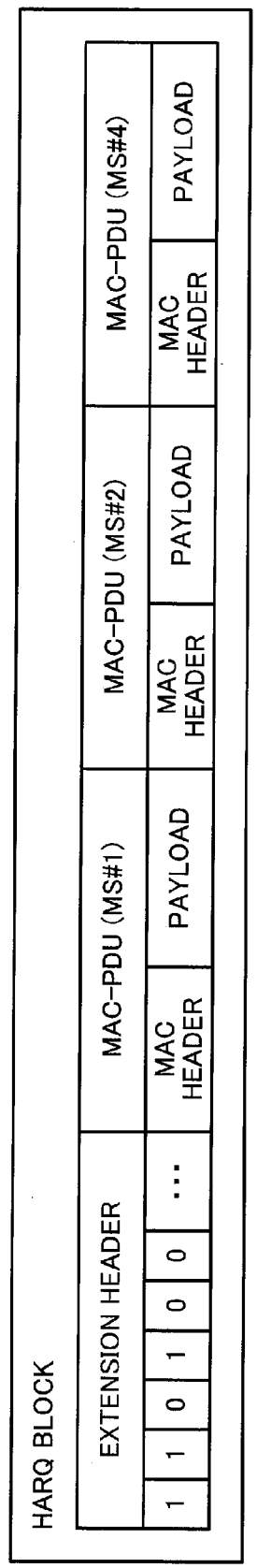

RELAY STATION, BASE STATION, AND RADIO COMMUNICATION METHOD

CROSS-REFERENCE TO RELATED APPLICATION

This application is a continuing application, filed under 35 U.S.C. §111(a), of International Application PCT/JP2009/068403, filed on Oct. 27, 2009.

FIELD

The embodiments discussed herein are related to a relay station, a base station, and a radio communication method.

BACKGROUND

At present radio communication systems, such as mobile phone systems and radio LANs (Local Area Networks), are widely used. Radio communication systems include a PMP (Point-to-MultiPoint) communication system in which a BS (Base Station) can communicate with a plurality of subscriber stations (MSs (Mobile Stations), for example). An example of a PMP communication system is specified in IEEE802.16d and IEEE802.16e which are specifications drawn up by IEEE (Institute of Electrical and Electronics Engineers) (see, for example, The Institute of Electrical and Electronics Engineers (IEEE), "IEEE Standard for Local and Metropolitan Area Networks Part 16: Air Interface for Fixed Broadband Wireless Access Systems", IEEE802.16-2004 and The Institute of Electrical and Electronics Engineers (IEEE), "IEEE Standard for Local and Metropolitan Area Networks Part 16: Air Interface for Fixed and Mobile Broadband Wireless Access Systems", IEEE802.16e-2005).

In addition, in some radio communication systems an RS (Relay Station) can relay radio communication between a base station and a plurality of mobile stations. An example of a relay method is specified in IEEE802.16j (see, for example, The Institute of Electrical and Electronics Engineers (IEEE), "IEEE Standard for Local and Metropolitan Area Networks Part 16: Air Interface for Broadband Wireless Access Systems: Multihop Relay", IEEE802.16j-2009). If a relay station is installed, extension of a coverage area or improvement in throughput can be expected. That is to say, there is a possibility that a mobile station outside a coverage area of a base station can perform communication via the relay station. In addition, even when a mobile station is in the coverage area of the base station, throughput may be enhanced by the use of the relay station.

For example, a base station transmits data to a mobile station via a relay station in the following way. The data is transmitted to the relay station by the use of a relay link between the base station and the relay station and is transferred to the mobile station by the use of an access link between the relay station and the mobile station. In addition, for example, a mobile station transmits data to the base station via the relay station in the following way. The data is transmitted to the relay station by the use of an access link and is transferred to the base station by the use of the relay link.

By the way, the improvement of a relay method is discussed animatedly in order to improve a communication speed or throughput further in such a radio communication system. During the discussion about IEEE802.16m, for example, the following proposal is made. Data corresponding to a plurality of mobile stations is combined into one block and is transferred by the use of a relay link (see, for example, Doo-hyun Sung, et al., "Relay addressing method in IEEE 802.16m", IEEE C80216m-09/0438r1, 2009 Feb. 27). For example, when a base station transmits data to a plurality of mobile stations, a relay station identifies a destination of each piece of data included in a block and transfers each piece of data to the destination mobile station. In addition, for example, when a plurality of mobile stations transmit data to the base station, the relay station combines the data from the plurality of mobile stations into a block and transfers the block to the base station.

In this case, there arises a problem about a method for identifying a mobile station corresponding to each piece of data included in a block transmitted by the use of a relay link. In order to solve the problem, the method of adding an extension header to the block transmitted by the use of the relay link is proposed. The following two methods are proposed regarding information described in the extension header (see, for example, Doo-hyun Sung, et al., "Relay addressing method in IEEE 802.16m", IEEE C80216m-09/0438r1, 2009 Feb. 27). One method is to describe identification information for identifying a mobile station which is a source or destination of each piece of data in the extension header. The other method is to describe a bit map the length of which corresponds to the number of mobile stations connected to a relay station in the extension header and to determine based on a bit whether or not there is data corresponding to each mobile station.

A media access control method by which a subscriber station outside a communication area of a base station can communicate with the base station via a relay station is devised (see, for example, Japanese Laid-open Patent Publication No. 2007-6199). Furthermore, the following radio communication method is devised. A radio terminal transmits a first ranging request message to a relay station. The relay station generates a second ranging request message to which an identifier which indicates that the ranging request is transmitted from the radio terminal is added, and transmits the second ranging request message to a base station (see, for example, Japanese Laid-open Patent Publication No. 2008-118500). In addition, the following communication control method is devised. A base station transmits to a user unit control information indicative of the amount of a radio resource used for a control channel (see, for example, Japanese Laid-open Patent Publication No. 2008-278341).

With the relay method proposed in Doo-hyun Sung, et al., "Relay addressing method in IEEE 802.16m", IEEE C80216m-09/0438r1, 2009 Feb. 27, however, there is room for improvement in data transfer efficiency. That is to say, with the method of adding identification information for a mobile station to a block and transmitting the block, the amount of a free radio resource decreases by the amount of the identification information. For example, if each piece of identification information is represented by twelve bits and a block including data corresponding to five mobile stations is transmitted, then a radio resource corresponding to 60(=12× 5) bits is used for an extension header.

Furthermore, with the method of transmitting a block including a bit map the length of which corresponds to the number of mobile stations connected to a relay station, the amount of a free radio resource also decreases with an increase in the number of mobile stations connected to the relay station. For example, it is assumed that one bit is assigned to each mobile station. If sixty mobile stations are connected to the relay station, then a radio resource corresponding to sixty bits is used for an extension header.

Accordingly, if the above extension header is transmitted, overhead is incurred. This overhead is problematic. In particular, if the amount of data, such as voice data in VoIP (Voice over Internet Protocol) communication, transmitted at a time is small, then the amount of a radio resource used for an extension header is relatively large. As a result, the above problem comes to the front.

SUMMARY

According to an aspect of the invention, a relay station for transferring data transmitted or received between a plurality of mobile stations and a base station includes a storage section which stores a table indicative of different correspondences between identification information for a mobile station and timing in a frame at which data from the mobile station is transmitted and a transmission processing section which transfers data from each mobile station to the base station on a frame based on a correspondence in the table selected according to the frame.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is an example of the structure of a schedule table;

FIG. 14 is an example of a service flow parameter;

FIG. 17 is an example of the structure of MAP information;

FIGS. 19A and 19B are second examples of the structure of a HARQ block;

FIGS. 20A and 20B are third examples of the structure of a HARQ block;

DESCRIPTION OF EMBODIMENTS

Figure 1:
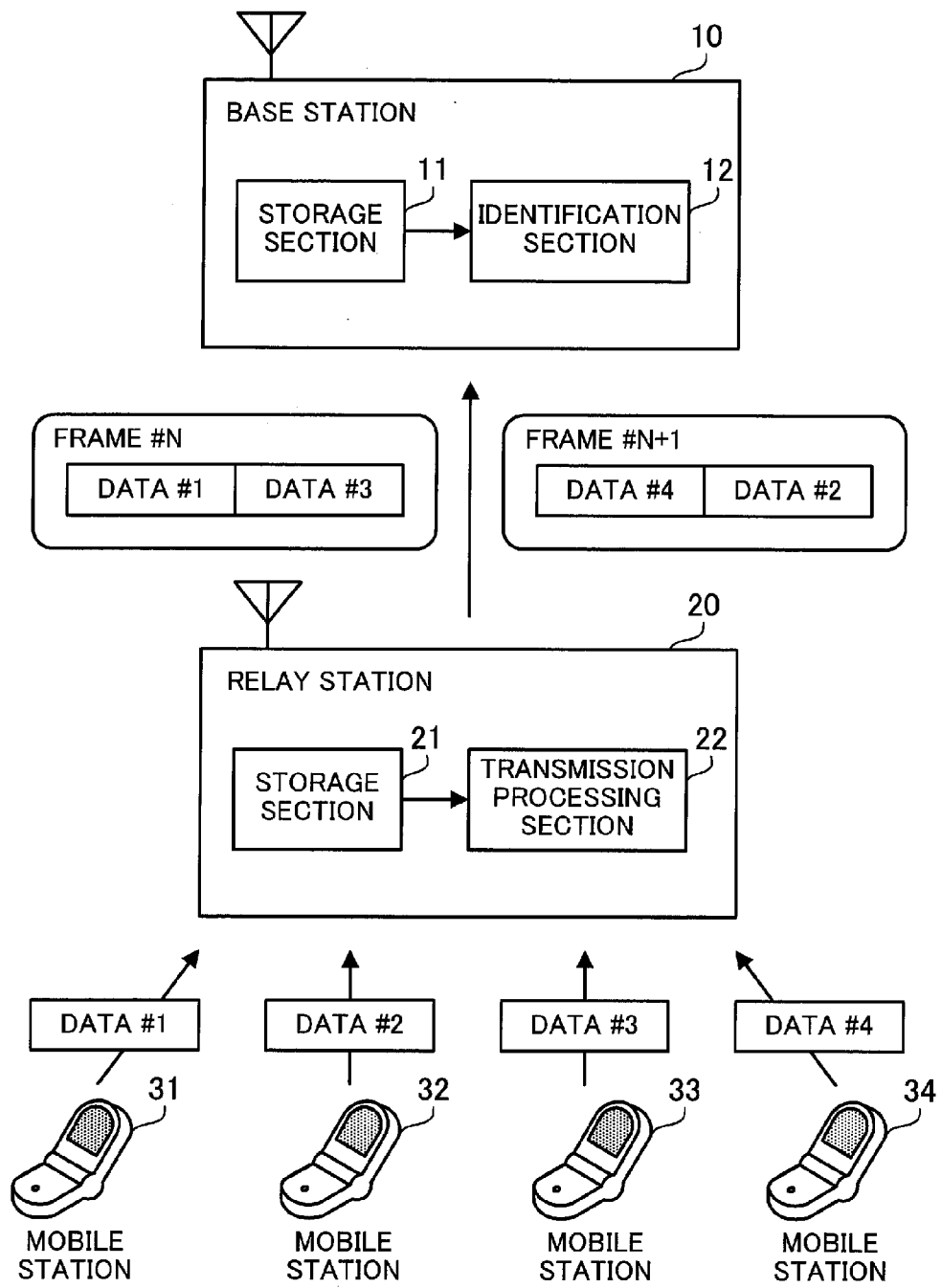
FIG. 1 illustrates a radio communication method according to a first embodiment (part 1)

Embodiments of the present invention will now be described in detail with reference to the accompanying drawings, wherein like reference numerals refer to like elements throughout.

First Embodiment

FIG. 1 illustrates a radio communication method according to a first embodiment (part 1). This mobile communication system includes a base station 10, a relay station 20, and mobile stations 31, 32, 33, and 34.

Data can be transmitted or received between the base station 10 and the mobile stations 31, 32, 33, and 34 via the relay station 20. A relay link which is a radio link is set between the base station 10 and the relay station 20. An access link which is a radio link is set between the relay station 20 and each of the mobile stations 31, 32, 33, and 34. Description will now be given with communication from the mobile stations 31, 32, 33, and 34 to the base station 10 (UL (UpLink) communication) distinguished from communication from the base station 10 to the mobile stations 31, 32, 33, and 34 (DL (DownLink) communication).

The base station 10 includes a storage section 11 and an identification section 12. The storage section 11 stores a table indicative of different correspondences between identification information for each mobile station and timing in a frame at which data from it is transmitted. Based on a correspondence in the table selected according to a frame, the identification section 12 identifies data from the mobile stations 31, 32, 33, and 34 in a frame received from the relay station 20.

The relay station 20 includes a storage section 21 and a transmission processing section 22. The storage section 21 stores a table indicative of different correspondences between identification information for each mobile station and timing in a frame at which data from it is transmitted. Based on a correspondence in the table selected according to a frame, the transmission processing section 22 transfers data from the mobile stations 31, 32, 33, and 34 to the base station 10.

In this case, management is performed so that the same correspondences will be registered in the table stored in the storage section 11 and the table stored in the storage section 21. For example, STID (STation IDentification) for each mobile station can be used as identification information registered in a table. A plurality of correspondences may be registered in one table or tables may be made according to correspondences.

Transmission timing regarding a part of all of the mobile stations 31, 32, 33, and 34 is registered in each correspondence. For example, transmission timing regarding the mobile stations 31 and 33 is registered in a correspondence and transmission timing regarding the mobile stations 32 and 34 is registered in another correspondence. One mobile station may appear in a plurality of correspondences. Correspondences may be set according to the units of retransmission control such as HARQ (Hybrid Automatic Repeat reQuest).

The cycle of a frame to which a correspondence is applied can be set in the correspondence. This means that data from a mobile station indicated in the correspondence can be transferred in the set cycle. In this case, the correspondence to be applied is selected by referring to a frame cycle. For example, if a cycle is two frames, then the correspondence is applied to alternate frames. For example, a frame cycle can be set at the time of establishing a service flow between the base station 10 and the mobile station 31, 32, 33, or 34, that is to say, at the time of connection setting before the beginning of transferring data for the service. However, a frame cycle may be set at the time of beginning to transfer data for the service.

In addition, an offset from a reference frame of a frame to which a correspondence is applied can be set in the correspondence. This means that data from a mobile station indicated in the correspondence can be transferred by a frame which is at the set offset in a series of frames. In this case, the correspondence to be applied is selected by referring to an offset. For example, a frame offset can be set at the time of beginning data transfer in accordance with a service flow established between the base station 10 and the mobile station 31, 32, 33, or 34. However, a frame offset may be set at the time of establishing a service flow.

All of the mobile stations 31, 32, 33, and 34 are not registered in a table. For example, only a part of the mobile stations 31, 32, 33, and 34 which perform communication for which persistent scheduling is favorable may be registered in a table. For example, voice communication such as VoIP communication is communication for which persistent scheduling is favorable. Whether to register in a table may be determined based on, for example, QoS (Quality of Service) at the time of establishing a service flow. However, a correspondence applied not to frames which appear intermittently but to all frames may be included in a table.

The base station 10 and the relay station 20 select one or more correspondences from among a plurality of correspondences according to a frame to be processed. A correspondence can be selected by comparing a frame cycle or an offset set in each correspondence with a current frame number. For example, if a cycle is two frames, whether to apply the correspondence can be determined based on whether a frame number is even or odd. In the first embodiment a "frame" is a certain transmission (or receiving) unit (transmission (or receiving) unit with certain time width, for example) in a radio interval and may include a transmission (or receiving) unit called by another name such as a subframe.

The transmission processing section 22 transfers data from a mobile station indicated in a selected correspondence to the base station 10 at timing in a frame indicated in the correspondence. If pieces of data from a plurality of mobile stations are transferred by the same frame, then the pieces of data may be arranged in order indicated in the correspondence to transfer them. Pieces of data from a plurality of mobile stations indicated in one correspondence may be concatenated into one HARQ block to transfer them. In this case, the whole of the pieces of data concatenated is a retransmission unit.

Order in which pieces of data from a plurality of mobile stations are arranged may be determined according to order in which the mobile stations 31, 32, 33, and 34 are registered in the table. For example, the mobile station 34 may be registered in the table before the mobile station 32 is registered in the table. That is to say, the mobile station 34 may establish a service flow before the mobile station 32 establishes a service flow. In this case, a piece of data from the mobile station 34 is arranged before a piece of data from the mobile station 32.

The transmission processing section 22 transmits data from a mobile station registered in the table at timing indicated in a correspondence. By doing so, the transmission processing section 22 can transfer the data without adding identification information for the mobile station. Based on a selected correspondence, the identification section 12 can identify mobile stations which transmit pieces of data that are included in the same frame and that differ in timing. It is desirable to transfer data from a mobile station not registered in the table by adding information, such as identification information for the mobile station, for identifying the mobile station which transmits the data.

If there is no data to be transferred for a mobile station indicated in a selected correspondence, then the transmission processing section 22 may transmit, for example, header information which indicates that data size is at timing indicated in the correspondence. In this case, the identification section 12 checks the data size described in the header information. If the data size is then the identification section 12 can determine that there is no data from the mobile station corresponding to timing at which the header information is received.

In addition, the transmission processing section 22 may transmit a bit string which has length corresponding to the number of mobile stations indicated in selected correspondence and which indicates whether or not there is data from these mobile stations to the base station 10 according to correspondences. For example, one bit is assigned to each mobile station. If there is data, then "1" is set. If there is no data, then "0" is set. A bit string may be transmitted by the same frame that is used for transferring data. For example, a bit string is concatenated to the head of data from a plurality of mobile stations and is transmitted as an extension header. In this case, by checking the bit string, the identification section 12 can determine whether or not there is data from each mobile station indicated in a correspondence. It can be expected that the length of the above bit string will be shorter than length corresponding to the number of all mobile stations connected to the relay station 20.

As has been described, with uplink communication in the first embodiment the relay station 20 transfers data from the mobile stations 31, 32, 33, and 34 to the base station 10 based on one of different correspondences between identification information for each mobile station and timing in a frame at which data from it is transmitted which is selected according to a frame. Based on a correspondences selected according to the frame, the base station 10 identifies data from each mobile station in the frame received from the relay station 20.

By doing so, the relay station 20 can efficiently transfer the data transmitted from the mobile stations 31, 32, 33, and 34 to the base station 10. That is to say, if data is transmitted from a mobile station registered in the table and the relay station 20 does not add identification information, the base station 10 can identify the source mobile station. As a result, the consumption of radio resources for the relay link can be controlled. Furthermore, even if the relay station 20 adds a bit string which indicates whether there is data or not, its length can be controlled. This is useful especially in communication, such as VoIP communication, in which a small amount of data is continuously transmitted. Moreover, the above control can be applied only to a specific kind of communication. As a result, a balance between radio resource consumption and control complexity or a processing load can be adjusted.

Figure 2:
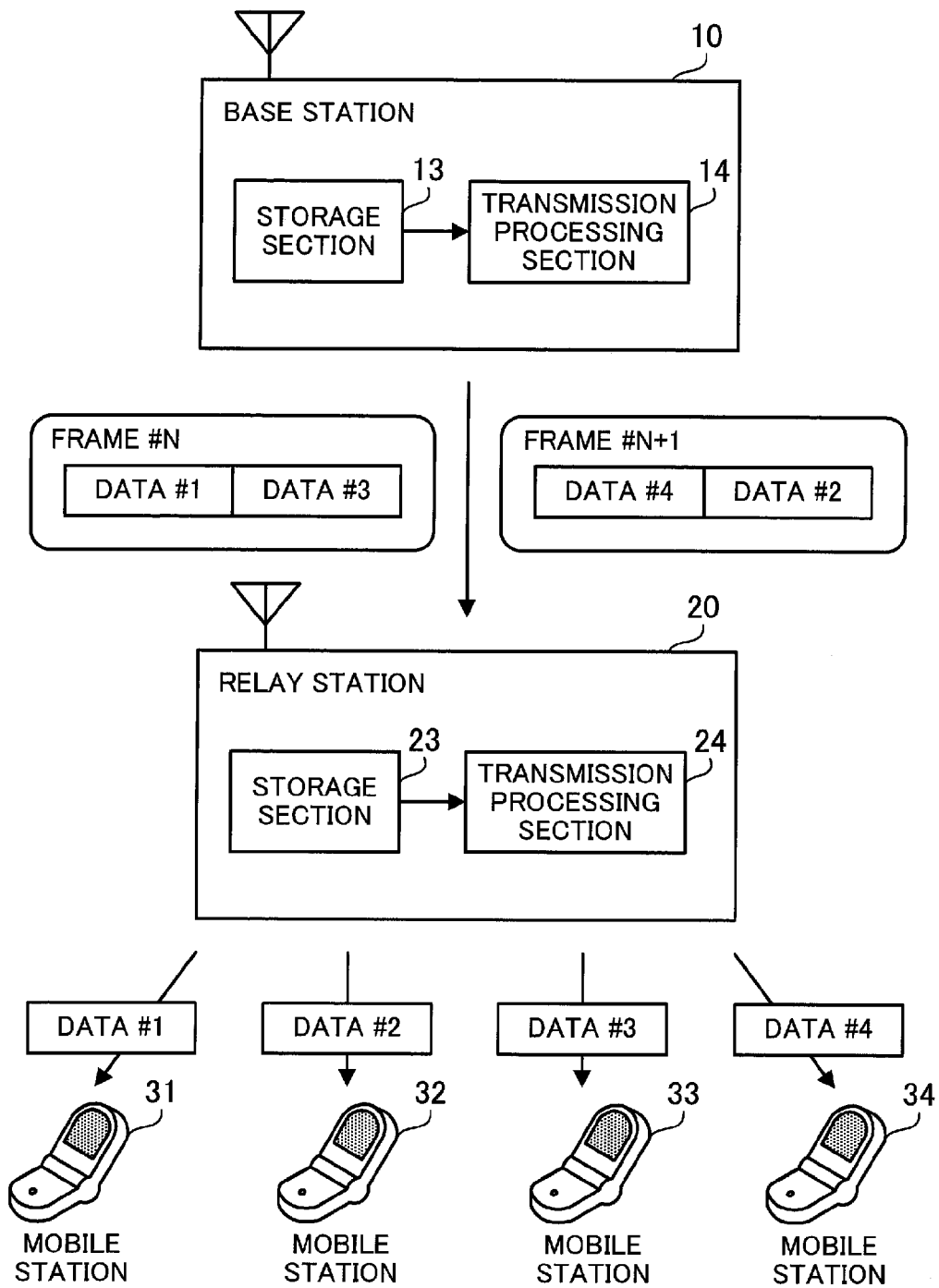
FIG. 2 illustrates the radio communication method according to the first embodiment (part 2)

FIG. 2 illustrates the radio communication method according to the first embodiment (part 2). FIG. 2 illustrates communication (downlink communication) from the base station 10 to the mobile stations 31, 32, 33, and 34.

The base station 10 includes a storage section 13 and a transmission processing section 14. The storage section 13 stores a table indicative of different correspondences between identification information for each mobile station and timing in a frame at which data to it is transmitted. Based on a correspondence in the table selected according to a frame, the transmission processing section 14 transmits data to the mobile stations 31, 32, 33, and 34 to the relay station 20.

The relay station 20 includes a storage section 23 and a transmission processing section 24. The storage section 23 stores a table indicative of different correspondences between identification information for each mobile station and timing in a frame at which data to it is transmitted. Based on a correspondence in the table selected according to a frame, the transmission processing section 24 transfers data in the frame received from the base station 10 to the mobile stations 31, 32, 33, and 34.

In this case, management is performed so that the same correspondences will be registered in the table stored in the storage section 13 and the table stored in the storage section 23. The data structure of a correspondence registered in the tables is the same as that described in the uplink communication. The same correspondences may be applied to the uplink communication and the downlink communication, or correspondences applied to the uplink communication may be managed separately from correspondences applied to the downlink communication. In the latter case, a correspondence applied to the uplink communication and a correspondence applied to the downlink communication may be registered in the same table or different tables.

The storage sections 11 and 13 included in the base station 10 may be the same and the storage sections 21 and 23 included in the relay station 20 may be the same. Furthermore, the transmission processing sections 22 and 24 included in the relay station 20 can be realized by the same circuit or different circuits.

The base station 10 and the relay station 20 select one or more correspondences from among a plurality of correspondences according to a frame to be processed. The same correspondence selection method that is used in the uplink communication may be used. Alternatively, a correspondence selection method different from that used in the uplink communication may be adopted.

The transmission processing section 14 transmits data to be transferred to a mobile station indicated in a selected correspondence to the relay station 20 at timing in a frame indicated in the correspondence. If pieces of data to be transferred to a plurality of mobile stations are transmitted by the same frame, then the pieces of data may be arranged in order indicated in the correspondence to transmit them. Based on the selected correspondence, the transmission processing section 24 can identify destination mobile stations of the pieces of data which are included in the same frame and which differ in timing, and transfer the pieces of data to the corresponding mobile stations.

If the relay station 20 receives a HARQ block including concatenated pieces of data to be transferred to a plurality of mobile stations by the relay link, then the relay station 20 extracts a piece of data to be transferred to each mobile station from the HARQ block. For example, the relay station 20 then stores a piece of data to be transferred to one mobile station in one HARQ block and transmits it. In this case, a piece of data to be transferred to each mobile station is a retransmission unit.

The same selected correspondence setting or application method that is used in the uplink communication may be used. Alternatively, a selected correspondence setting or application method different from that used in the uplink communication may be adopted. Furthermore, as described in the uplink communication, the transmission processing section 14 may transmit header information which indicates that data size is "0" at timing indicated in a selected correspondence in a case where there is no data to be transmitted to a mobile station indicated in the correspondence. In addition, the transmission processing section 14 may transmit a bit string which indicates whether or not there is data to be transmitted to a mobile station indicated in the selected correspondence to the relay station 20 as an extension header.

As has been described, with downlink communication in the first embodiment the base station 10 transmits data to be transferred to the mobile stations 31, 32, 33, and 34 to the relay station 20 based on a correspondence selected according to a frame from among different correspondences between identification information for each mobile station and timing in a frame at which data is transmitted to it. The relay station 20 transfers the data in the frame received from the base station to the mobile stations 31, 32, 33, and 34 based on a correspondence selected according to the frame.

By doing so, data transmitted by the base station 10 can be transferred efficiently to the mobile stations 31, 32, 33, and 34. That is to say, even if the base station 10 does not add identification information, the relay station 20 can identify a destination of data which is a mobile station registered in the table. As a result, the consumption of radio resources for the relay link can be controlled. Furthermore, even if the base station 10 adds a bit string which indicates whether there is data or not, its length can be controlled. This is useful especially in communication, such as VoIP communication, in which a small amount of data is continuously transmitted. Moreover, the above control can be applied only to a specific kind of communication. As a result, a balance between radio resource consumption and control complexity or a processing load can be adjusted.

In the above description the base station 10 and the relay station 20 exercise data transfer control both in the uplink communication and in the downlink communication by referring to the tables. Furthermore, in the following second embodiment the above data transfer control is also applied both to the uplink communication and to the downlink communication. However, it is possible to apply the above data transfer control only to one of the uplink communication and the downlink communication.

Second Embodiment

Figure 3:
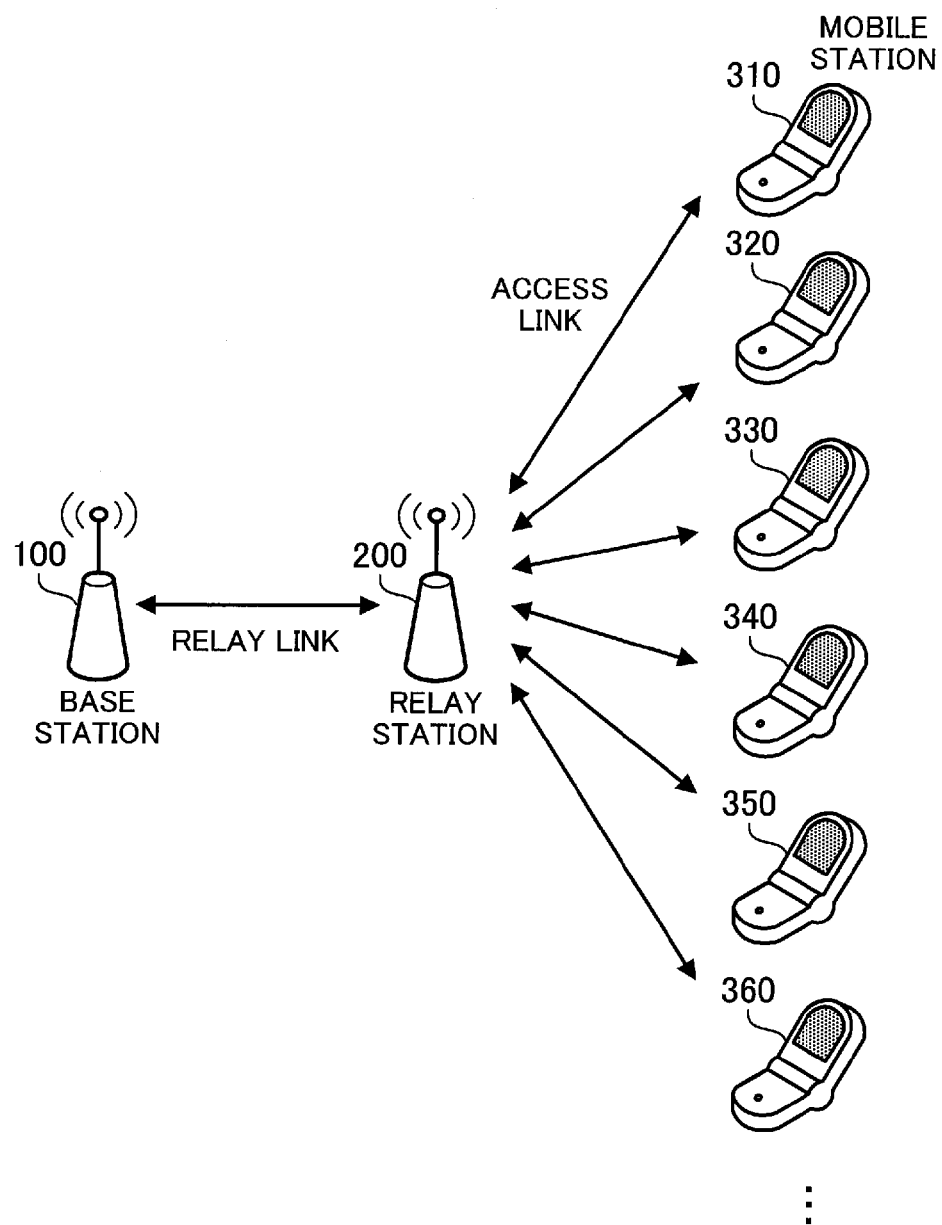
FIG. 3 illustrates a mobile communication system according to a second embodiment.

FIG. 3 illustrates a mobile communication system according to the second embodiment. A mobile communication system according to the second embodiment includes a base station 100, a relay station 200, and mobile stations 310 through 360. The relay station 200 is located in an area in which it can perform radio communication with the base station 100. The mobile stations 310 through 360 are located in an area in which they can perform radio communication with the relay station 200.

The base station 100 is a radio communication apparatus which can perform radio communication with the relay station 200 and which can communicate with the mobile stations 310 through 360 via the relay station 200. The base station 100 transmits user data destinations of which are the mobile stations 310 through 360 and control data a destination of which is the relay station 200 by the use of a relay link. In addition, the base station 100 receives user data transmitted by the mobile stations 310 through 360 and control data transmitted by the relay station 200 by the use of the relay link. Furthermore, the base station 100 can perform radio communication directly with another mobile station (not illustrated) which is in its cell. The base station 100 is connected to an upper station or another base station (not illustrated) by wire.

The relay station 200 is a radio communication apparatus which transfers user data between the base station 100 and the mobile stations 310 through 360 by radio. The relay station 200 identifies a destination of user data received from the base station 100 by the use of the relay link, and transfers the user data to a destination mobile station by the use of an access link. In addition, the relay station 200 receives user data from the mobile stations 310 through 360 by the use of access links and transfers the user data to the base station 100 by the use of the relay link. Furthermore, the relay station 200 transmits or receives control data according to circumstances by the use of the relay link or an access link. The relay station 200 may be a fixed relay station or a mobile relay station.

The mobile stations 310 through 360 are radio terminal devices which are connected to the relay station 200 by radio and which can communicate with the base station 100 via the relay station 200. For example, portable telephones or information terminal devices with a radio interface can be used as the mobile stations 310 through 360. The mobile stations 310 through 360 receive user data or control data destinations of which are them by the use of the access links. In addition, the mobile stations 310 through 360 transmit user data a destination of which is the base station 100 and control data a destination of which is the relay station 200.

Figure 4:
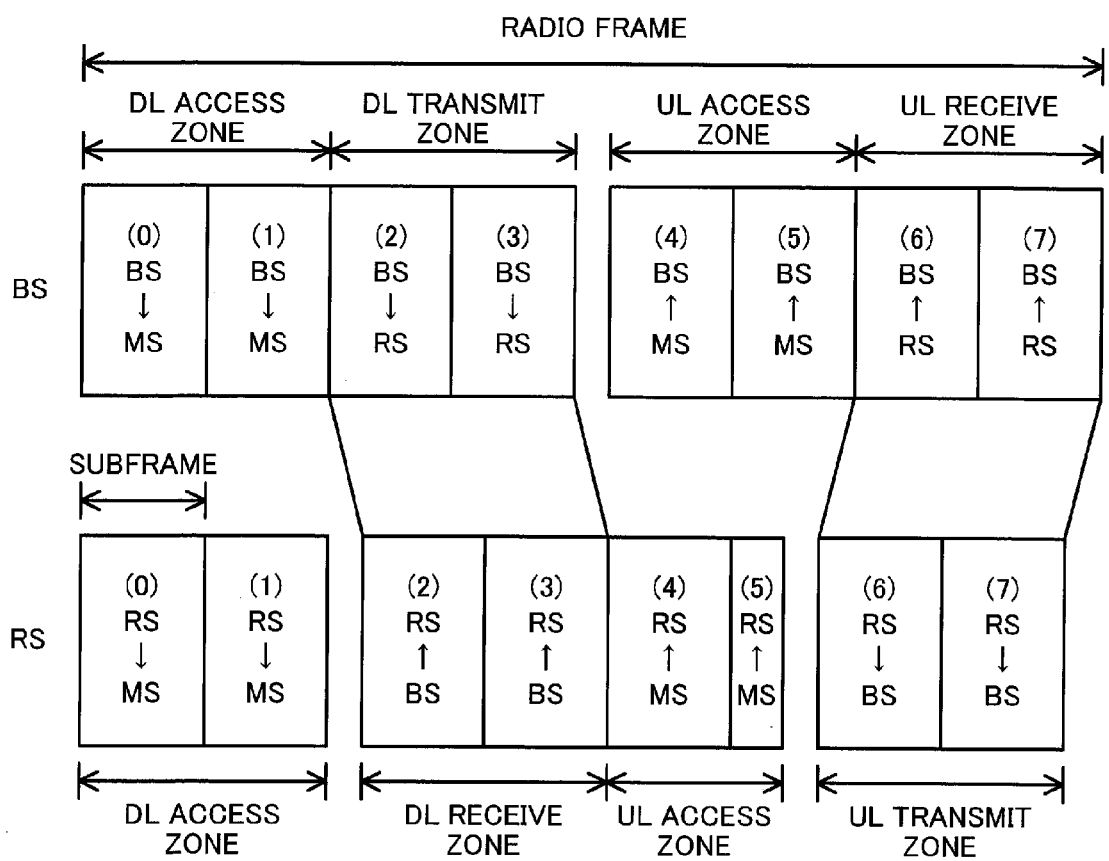
FIG. 4 is an example of the structure of each radio frame.

FIG. 4 is an example of the structure of each radio frame. Each of the base station 100 and the relay station 200 manages a radio frame. Eight subframes #0 through #7 are included in each of a radio frame (BS frame) transmitted or received by the base station 100 and a radio frame (RS frame) transmitted or received by the relay station 200.

Subframes #0 and #1 of the BS frame are assigned to a DL access zone. The DL access zone is used by the base station 100 for transmitting user data or control data directly to a mobile station in its cell. Subframes #2 and #3 are assigned to a DL transmit zone. The DL transmit zone is used by the base station 100 for transmitting user data or control data to the relay station 200.

Subframes #4 and #5 are assigned to a UL access zone. The UL access zone is used by the base station 100 for receiving user data or control data directly from a mobile station in its cell. A gap is inserted between the subframes #3 and #4. Subframes #6 and #7 are assigned to a UL receive zone. The UL receive zone is used by the base station 100 for receiving user data or control data from the relay station 200.

On the other hand, subframes #0 and #1 of the RS frame are assigned to a DL access zone. The DL access zone is used by the relay station 200 for transmitting user data or control data to the mobile stations 310 through 360. Subframes #2 and #3 are assigned to a DL receive zone. The DL receive zone corresponds to the DL transmit zone of the BS frame and is used by the relay station 200 for receiving user data or control data from the base station 100. A gap is inserted between the subframes #1 and #2 with a time lag between transmission by the base station 100 and receiving by the relay station 200 taken into consideration.

Subframes #4 and #5 are assigned to a UL access zone. The UL access zone is used by the relay station 200 for receiving user data or control data from the mobile stations 310 through 360. Subframes #6 and #7 are assigned to a UL transmit zone. The UL transmit zone corresponds to the UL receive zone of the BS frame and is used by the relay station 200 for transmitting user data or control data to the base station 100. A gap is inserted between the subframes #5 and #6.

The radio frames each having the above structure can be realized by the use of, for example, OFDM (Orthogonal Frequency Division Multiplexing) or OFDMA (Orthogonal Frequency Division Multiple Access). In this case, a vertical direction and a horizontal direction in FIG. 4 are set as a frequency axis and a time axis, respectively, and a radio resource on a frequency x time domain is assigned to each subframe.

The structure of each radio frame illustrated in FIG. 4 is an example. Another radio frame structure may be adopted. In the example of FIG. 4, for example, TDD (Time Division Duplex) is used for performing both of the uplink communication and the downlink communication. However, FDD (Frequency Division Duplex) may be used.

Figure 5:
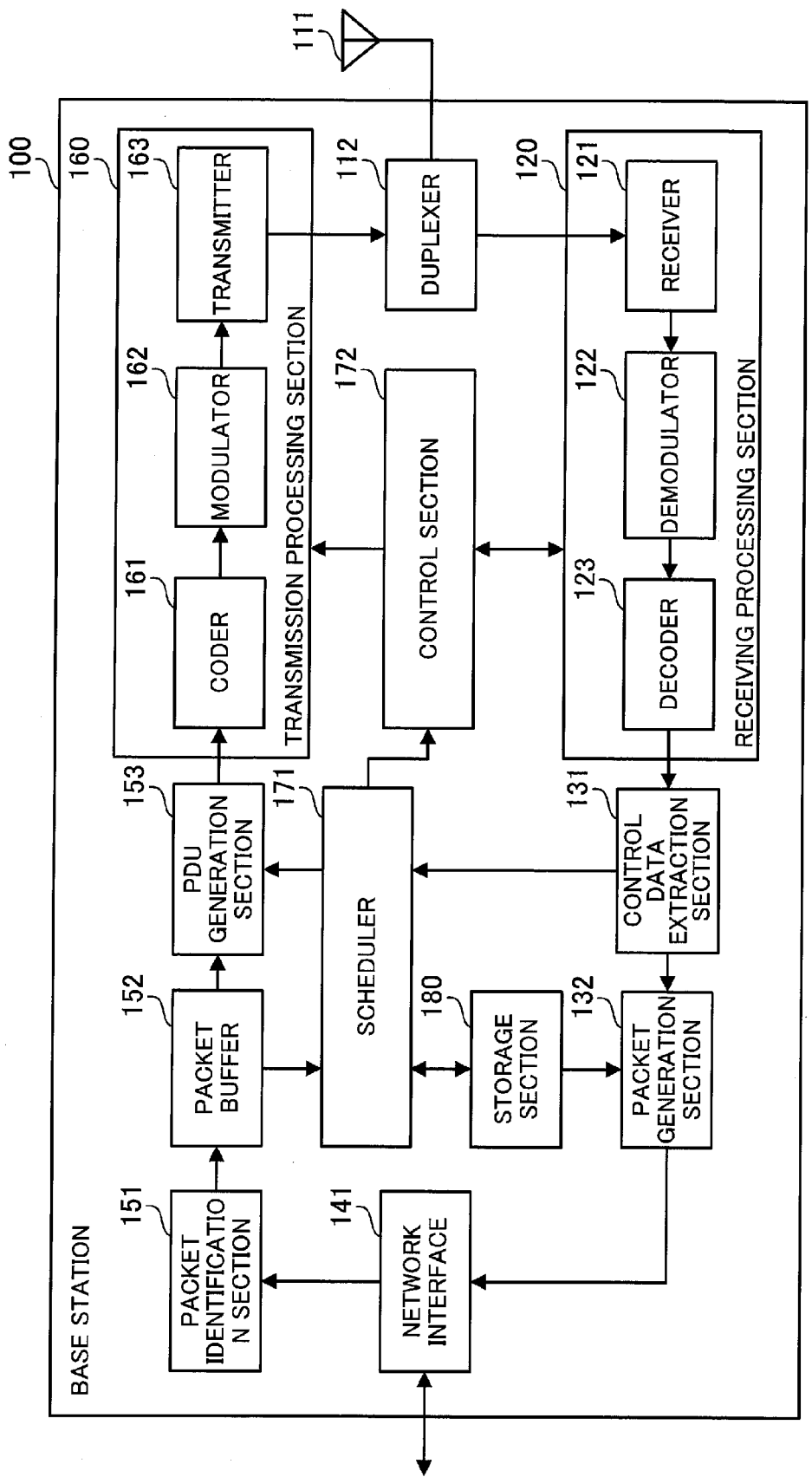
FIG. 5 is a block diagram of a base station.

FIG. 5 is a block diagram of the base station. The base station 100 includes an antenna 111, a duplexer 112, a receiving processing section 120, a control data extraction section 131, a packet generation section 132, a network interface 141, a packet identification section 151, a packet buffer 152, a PDU (Protocol Data Unit) generation section 153, a transmission processing section 160, a scheduler 171, a control section 172, and a storage section 180.

The antenna 111 is used both for transmission and for receiving. The antenna 111 receives a radio signal and outputs it to the duplexer 112. In addition, the antenna 111 radio-outputs a transmitted signal acquired from the duplexer 112. However, the base station 100 may include a transmission antenna and a receiving antenna which are separate from each other. Furthermore, the base station 100 may include a plurality of antennas for diversity transmission.

The duplexer 112 is a circuit for separating a transmitted signal and a received signal and is also referred to as an antenna sharing device. The duplexer 112 outputs the received signal acquired from the antenna 111 to the receiving processing section 120. In addition, the duplexer 112 outputs the transmitted signal acquired from the transmission processing section 160 to the antenna 111. The duplexer 112 performs, for example, signal filtering for preventing the transmitted signal from flowing into a circuit on the receiving side.

In accordance with instructions from the control section 172 the receiving processing section 120 demodulates and decodes the received signal acquired from the duplexer 112 and outputs it to the control data extraction section 131. The receiving processing section 120 includes a receiver 121, a demodulator 122, and a decoder 123.

The receiver 121 converts the received signal acquired from the duplexer 112 to a base band signal and outputs the received signal after the conversion to the demodulator 122. In order to convert the received signal to a base band signal, the receiver 121 includes an LNA (Low Noise Amplifier), a frequency converter, a BPF (Band-Pass Filter), an A/D (Analog-to-Digital) converter, and the like.

The demodulator 122 demodulates the base band signal acquired from the receiver 121 and outputs coded data obtained to the decoder 123. The demodulation is performed by a method corresponding to a determined modulation scheme or a modulation scheme designated by the control section 172. Candidate modulation schemes include digital modulation schemes such as QPSK (Quadrature Phase Shift Keying) and 16QAM (Quadrature Amplitude Modulation).

The decoder 123 performs error correction decoding on the coded data acquired from the demodulator 122, and outputs obtained data (including user data and control data) to the control data extraction section 131. The error correction decoding is performed by a method corresponding to a determined coding scheme or a coding scheme designated by the control section 172. Candidate coding schemes include a turbo code and an LDPC (Low Density Parity Check) code. If a bit string without an error cannot be obtained by the error correction decoding, then the receiving processing section 120 requests the control section 172 to perform retransmission.

The control data extraction section 131 extracts the control data transmitted by the relay station 200 from the data acquired from the receiving processing section 120. The control data extraction section 131 then outputs the extracted control data to the scheduler 171. The extracted control data includes a DSA-REQ (Dynamic Service Addition REQuest) message and a DSD-REQ (Dynamic Service Deletion REQuest) message described later. In addition, the control data extraction section 131 outputs the user data transferred by the relay station 200 to the packet generation section 132.

The packet generation section 132 converts the user data acquired from the control data extraction section 131 to a packet format used for transmission between the base station 100 and an upper station or another base station. The packet generation section 132 then outputs a data packet obtained to the network interface 141. At this time the packet generation section 132 refers to information stored in the storage section 180, identifies a source mobile station of each piece of user data, and separates pieces of user data. The packet generation section 132 can be considered as an example of the identification section 12 in the first embodiment.

The network interface 141 is connected to a wired network and can transmit a data packet to or receive a data packet from the upper station or another base station. The network interface 141 outputs the data packet acquired from the packet generation section 132 to the network. In addition, the network interface 141 outputs a data packet received from the network to the packet identification section 151.

The packet identification section 151 refers to a header of the data packet acquired from the network interface 141 and identifies a destination of the data packet and a data type. The packet identification section 151 then stores the data packet in a proper position in the packet buffer 152 according to an identification result.

The packet buffer 152 is a buffer memory for temporarily storing the data packet received from the upper station or another base station. The packet buffer 152 has a plurality of storage areas and classifies and holds data packets according to destinations or data types. The packet buffer 152 then outputs a data packet held in response to access from the PDU generation section 153.

In accordance with instructions from the scheduler 171 the PDU generation section 153 acquires a data packet stored in the packet buffer 152. In addition, the PDU generation section 153 acquires control data generated by the scheduler 171. The PDU generation section 153 then converts user data included in the data packet and the control data to a MAC (Medium Access Control)-PDU format used in a radio interval, and outputs them to the transmission processing section 160. A MAC-PDU includes a MAC header and a payload which is data proper.

In accordance with instructions from the control section 172 the transmission processing section 160 codes and modulates the MAC-PDU acquired from the PDU generation section 153, generates a control signal, and generates a transmitted signal which is a radio frame. The transmission processing section 160 then outputs the generated transmitted signal to the duplexer 112. The transmission processing section 160 includes a coder 161, a modulator 162, and a transmitter 163.

The coder 161 adds parity for error detection to the MAC-PDU acquired from the PDU generation section 153, performs error correction coding, and outputs coded data to the modulator 162. The error correction coding is performed by a method corresponding to a determined coding scheme or a coding scheme designated by the control section 172. Candidate coding schemes include the turbo code and the LDPC code.

The modulator 162 modulates the coded data acquired from the coder 161, and outputs a base band signal after the modulation to the transmitter 163. The modulation is performed by a method corresponding to a determined modulation scheme or a modulation scheme designated by the control section 172. Candidate modulation schemes include digital modulation schemes such as QPSK and 16QAM.

The transmitter 163 converts the base band signal acquired from the modulator 162 to a radio signal and outputs the radio signal after the conversion to the duplexer 112. In order to convert the base band signal to a radio signal, the transmitter 163 includes a quadrature modulator, a D/A (Digital-to-Analog) converter, a frequency converter, a BPF, a power amplifier, and the like.

The scheduler 171 monitors a data packet store state of the packet buffer 152. Based on the data packet store state and the control data acquired from the control data extraction section 131, the scheduler 171 then performs scheduling of data transmission and receiving and gives the PDU generation section 153 instructions concerning transmission timing. The scheduler 171 determines according to service flows corresponding to mobile stations whether to apply persistent scheduling to data transmission between the base station 100 and the relay station 200. If persistent scheduling is applied to data transmission between the base station 100 and the relay station 200, then the scheduler 171 registers information indicative of transmission timing in the storage section 180. After that, the scheduler 171 performs scheduling by referring to the information.

In addition, the scheduler 171 generates the control data and outputs it to the PDU generation section 153. The generated control data includes a DSA-RSP (DSA ReSPonse) message described later. Furthermore, the scheduler 171 generates MAP information described later and outputs it to the PDU generation section 153. Moreover, the scheduler 171 informs the control section 172 about a scheduling result. The transmission processing section 160 and the scheduler 171 can be considered as an example of the transmission processing section 14 in the first embodiment.

The control section 172 controls a receiving process by the receiving processing section 120 and a transmission process by the transmission processing section 160. The control section 172 designates an MCS (Modulation and Coding Scheme) according to the scheduling result about which the scheduler 171 informs the control section 172. In addition, when the receiving processing section 120 makes a retransmission request, the control section 172 gives the transmission processing section 160 instructions to generate a control signal indicative of the retransmission request.

The storage section 180 stores schedule information regarding the persistent scheduling. For example, a nonvolatile memory can be used as the storage section 180. Information stored in the storage section 180 is updated according to circumstances by the scheduler 171. In addition, information stored in the storage section 180 is referred to by the packet generation section 132 and the scheduler 171. The details of the schedule information will be described later. The storage section 180 can be considered as an example of the storage section 11 or 13 in the first embodiment.

Figure 6:
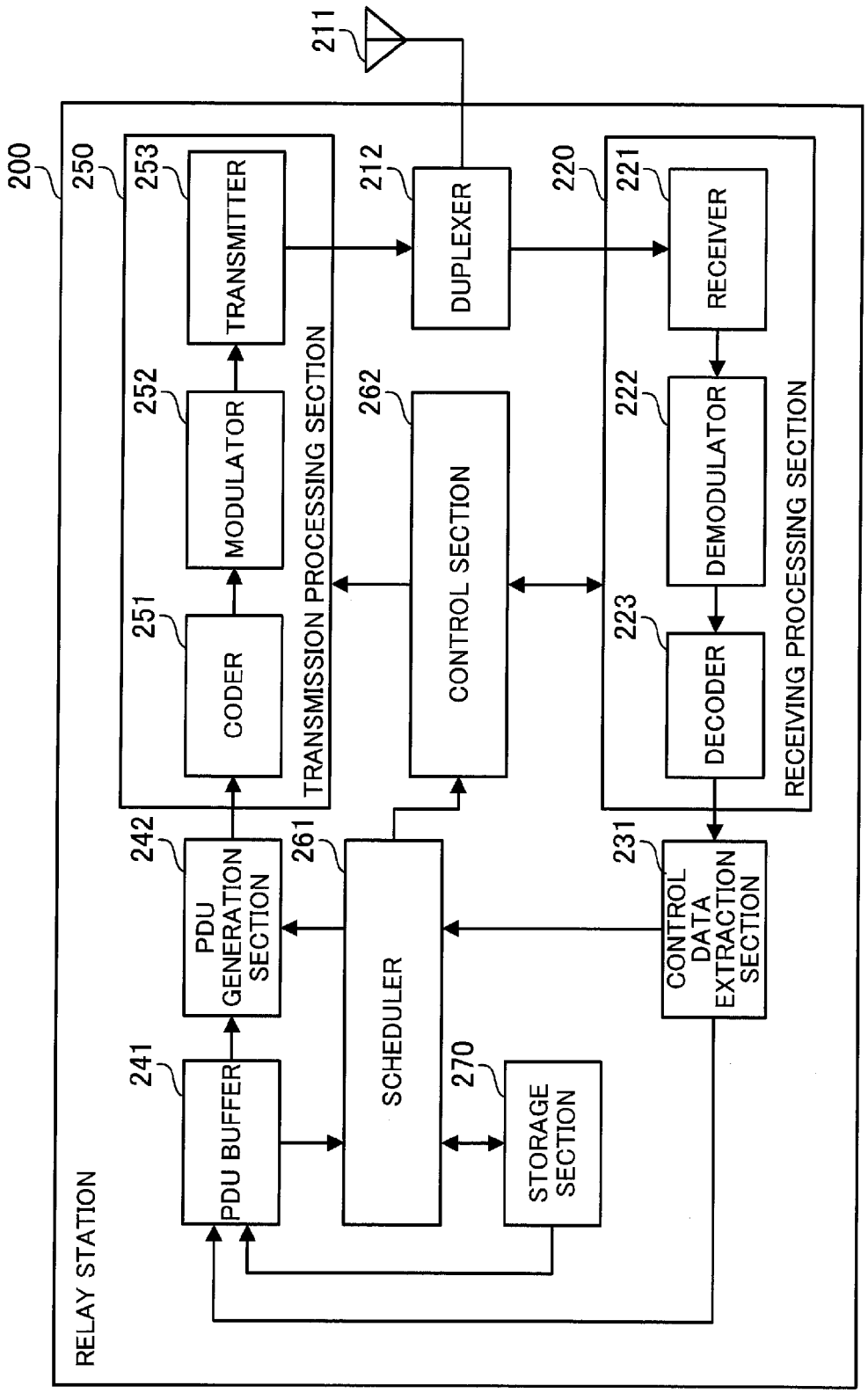
FIG. 6 is a block diagram of a relay station.

FIG. 6 is a block diagram of the relay station. The relay station 200 includes an antenna 211, a duplexer 212, a receiving processing section 220, a control data extraction section 231, a PDU buffer 241, a PDU generation section 242, a transmission processing section 250, a scheduler 261, a control section 262, and a storage section 270. The operation of the antenna 211, the duplexer 212, the receiving processing section 220, the transmission processing section 250, and the control section 262 is the same as that of the components in the base station 100 having the same names, so descriptions of them will be omitted.

The control data extraction section 231 extracts control data transmitted by the base station 100 and the mobile stations 310 through 360 from data outputted by the receiving processing section 220. The control data extraction section 231 then outputs the extracted control data to the scheduler 261. The extracted control data includes a DSA-REQ message, a DSA-RSP message, a DSD-REQ message, and a DSD-RSP message described later. In addition, the control data extraction section 231 outputs user data in a MAC-PDU format transmitted by the base station 100 and the mobile stations 310 through 360 to the PDU buffer 241.

The PDU buffer 241 temporarily stores the MAC-PDUs to be transferred to the base station 100 and the mobile stations 310 through 360 which are acquired from the control data extraction section 231. The PDU buffer 241 has a plurality of storage areas and classifies and holds the MAC-PDUs according to destinations or data types. At this time the PDU buffer 241 refers to information stored in the storage section 270, identifies a destination mobile station of each MAC-PDU, and separates the MAC-PDUs. In response to access from the PDU generation section 242 the PDU buffer 241 then outputs a MAC-PDU which it holds. The PDU buffer 241 and the transmission processing section 250 can be considered as an example of the transmission processing section 22 or 24 in the first embodiment.

In accordance with instructions from the scheduler 261 the PDU generation section 242 acquires a MAC-PDU stored in the PDU buffer 241. In addition, the PDU generation section 242 acquires control data generated by the scheduler 261. The PDU generation section 242 then converts the acquired MAC-PDU and control data to a MAC-PDU the format of which is suitable for a radio interval on the output side, and outputs it to the transmission processing section 250.

The scheduler 261 monitors a MAC-PDU store state of the PDU buffer 241. Based on the MAC-PDU store state and the control data acquired from the control data extraction section 231, the scheduler 261 then performs scheduling of data transfer and gives the PDU generation section 242 instructions concerning transmission timing. Instructions are given by the control data from the base station 100 as to whether to apply persistent scheduling to data transmission between the base station 100 and the relay station 200. If persistent scheduling is applied to data transmission between the base station 100 and the relay station 200, then the scheduler 261 registers information indicative of transmission timing in the storage section 270. After that, the scheduler 261 performs scheduling by referring to the information.

In addition, the scheduler 261 generates the control data and outputs it to the PDU generation section 242. The generated control data includes a DSA-REQ message, a DSA-RSP message, a DSD-REQ message, and a DSD-RSP message described later. Furthermore, the scheduler 261 generates MAP information described later and outputs it to the PDU generation section 242. Moreover, the scheduler 261 informs the control section 262 about a scheduling result.

The storage section 270 stores schedule information regarding the persistent scheduling. For example, a nonvolatile memory can be used as the storage section 270. Information stored in the storage section 270 is updated according to circumstances by the scheduler 261 so that it will be the same as information stored in the storage section 180 of the base station 100. In addition, information stored in the storage section 270 is referred to by the PDU buffer 241 and the scheduler 261. The details of the schedule information will be described later. The storage section 270 can be considered as an example of the storage section 21 or 23 in the first embodiment.

FIG. 7 is an example of the structure of a schedule table. A schedule table 181 is stored in the storage section 180 of the base station 100. Furthermore, the same table is stored in the storage section 270 of the relay station 200. The schedule table 181 includes STID, DL Interval, UL Interval, UL Offset, DL Offset, and Group ID items. Pieces of information in these items arranged in the horizontal direction are associated with one another and make up schedule information.

Identification information for a mobile station to which persistent scheduling is applied is set in the STID item. A cycle in which a DL resource for the relay link is assigned is set in the DL Interval item. A cycle in which a UL resource for the relay link is assigned is set in the UL Interval item. The unit of a DL interval and a UL interval is, for example, the number of subframes.

An offset from a reference subframe of a subframe to which a UL resource is assigned is set in the UL Offset item. An offset from a reference subframe of a subframe to which a DL resource is assigned is set in the DL Offset item. The unit of an offset is, for example, the number of subframes. The reference subframe is a subframe which appears intermittently, and there may be various selection methods. For example, the reference subframe may be selected based on a frame number and a subframe number.

For example, the reference subframe is defined as a leading subframe of a radio frame having a frame number which is divisible by (interval/(number of subframes included in one radio frame)). If an interval is 16 subframes and 8 subframes are included in one radio frame, then the reference subframe is a leading subframe (subframe #0) of a radio frame the frame number of which is even. If an offset is 2 subframes, then a radio resource is assigned to a subframe (subframe #2) two after the subframe #0.

Identification information for identifying a group for which user data is combined into one HARQ block for transmission is set in the Group ID item. Retransmission control is exercised according to groups. For example, the mobile stations 310 through 340 (MS#1 through MS#4) form a group 1 and the mobile stations 350 and 360 form a group 2. In this case, user data corresponding to the mobile stations 310 through 340 is combined into one HARQ block and user data corresponding to the mobile stations 350 and 360 is combined into another HARQ block.

The schedule table 181 holds order in at least the same group in which schedule information is registered. For example, a new record is registered at the end (in the bottom line) of the schedule table 181. Furthermore, when a record is deleted, records after it are moved up. However, the schedule table 181 may include an item (Time Stamp item, for example) for determining registration order.

Furthermore, the schedule table 181 may be divided into a plurality of tables. For example, tables may be made according to groups. In addition, separate tables may be made for the uplink communication and the downlink communication. In the example of the data structure indicated in FIG. 7, the same interval and offset are set in each of the uplink communication and the downlink communication for each mobile station in the same group. However, separate groups may be set in the uplink communication and the downlink communication. In addition, an interval and an offset may be set only in one of the uplink communication and the downlink communication. A set of schedule information which belongs to the same group can be considered as an example of a correspondence in the first embodiment.

Figure 8:
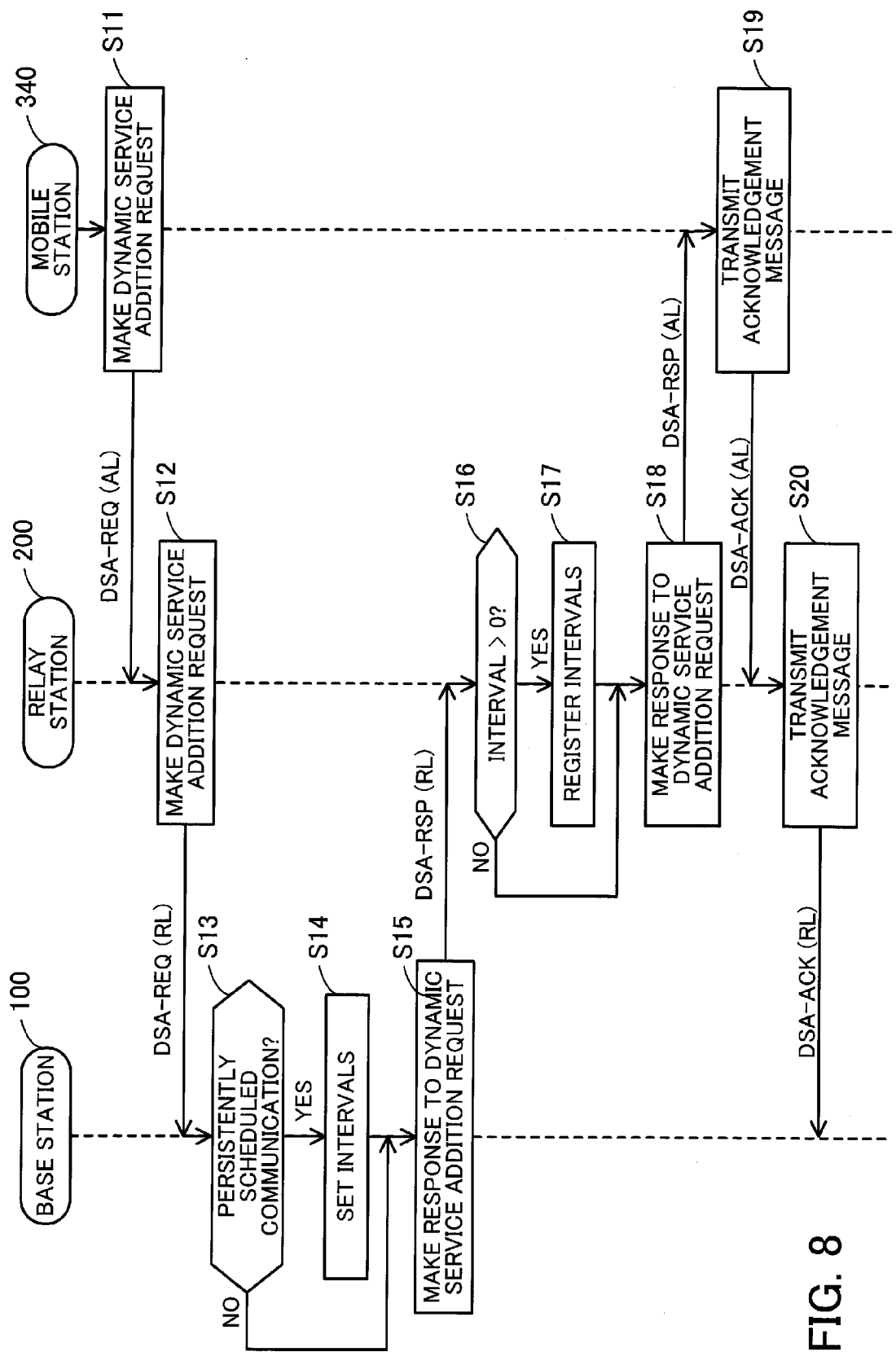
FIG. 8 is a flow chart of a service addition process.

FIG. 8 is a flow chart of a service addition process. A service flow is established, for example, at the time of starting a communication service, such as VoIP communication, and before starting user data transmission or receiving. It is assumed that a service flow is established in response to a request from the mobile station 340. The process illustrated in FIG. 8 will now be described in order of step number.

(Step S11) The mobile station 340 transmits a dynamic service addition request message (DSA-REQ message) to the relay station 200 by the use of the access link. The DSA-REQ message transmitted by the mobile station 340 includes various parameters, such as a minimum reserved traffic rate, which are referred to at the time of service flow establishment.

(Step S12) The receiving processing section 220 of the relay station 200 receives the DSA-REQ message from the mobile station 340. The scheduler 261 generates a DSA-REQ message to be transmitted by the use of the relay link based on the acquired DSA-REQ message. The transmission processing section 250 transmits the generated DSA-REQ message to the base station 100. Parameters which are not included in the message transmitted from the mobile station 340 are added to the DSA-REQ message transmitted to the base station 100.

(Step S13) The receiving processing section 120 of the base station 100 receives the DSA-REQ message from the relay station 200. Based on the parameters included in the acquired DSA-REQ message, the scheduler 171 determines whether or not it is preferable to perform the persistent allocation of a radio resource to the communication. If it is preferable to perform persistent allocation of a radio resource to the communication, then the scheduler 171 proceeds to step S14. If it is not preferable to perform the persistent allocation of a radio resource to the communication, then the scheduler 171 proceeds to step S15.

(Step S14) The scheduler 171 of the base station 100 sets a DL interval and a UL interval for a service flow which the mobile station 340 starts. The scheduler 171 may determine the intervals by referring to parameters included in the DSA-REQ message. The scheduler 171 then registers STID of the mobile station 340 and the set DL interval and UL interval in the schedule table 181 stored in the storage section 180. These pieces of information are added to the end of the schedule table 181.

(Step S15) The scheduler 171 generates a message (DSA-RSP message) of a response to the dynamic service addition request. The transmission processing section 160 transmits the generated DSA-RSP message to the relay station 200 by the use of the relay link. If the scheduler 171 sets the intervals in step S14, then the DSA-RSP message transmitted includes parameters indicative of the set intervals.

If a service flow cannot be established because of, for example, a lack of radio resources for the relay link, then a DSA-RSP message including a parameter indicative of the rejection of the dynamic service addition request may be transmitted to the relay station 200.

(Step S16) The receiving processing section 220 of the relay station 200 receives the DSA-RSP message from the base station 100. The scheduler 261 determines whether or not the acquired DSA-RSP message includes a parameter indicative of a DL interval or a UL interval greater than 0. If a parameter indicative of a DL interval or a UL interval greater than 0 is included, then the scheduler 261 proceeds to step S17. If a parameter indicative of a DL interval or a UL interval greater than 0 is not included, then the scheduler 261 proceeds to step S18.

(Step S17) The scheduler 261 of the relay station 200 registers the STID of the mobile station 340 and the DL interval and the UL interval about which the base station 100 informs the relay station 200 in the schedule table stored in the storage section 270. These pieces of information are added to the end of the schedule table.

(Step S18) The scheduler 261 of the relay station 200 generates a message (DSA-RSP message) of a response to the dynamic service addition request. The transmission processing section 250 transmits the generated DSA-RSP message to the mobile station 340 by the use of the access link. The message transmitted includes a part of parameters included in the message received from the base station 100.

If a service flow cannot be established because of, for example, the rejection of the dynamic service addition request by the base station 100 or a lack of radio resources for the access link, then a DSA-RSP message including a parameter indicative of the rejection of the dynamic service addition request may be transmitted to the mobile station 340.

(Step S19) The mobile station 340 receives the DSA-RSP message from the relay station 200. The mobile station 340 then transmits to the relay station 200 by the use of the access link an acknowledgement message (DSA-ACK) to the effect that the mobile station 340 has received the response message.

(Step S20) The receiving processing section 220 of the relay station 200 receives the DSA-ACK message from the mobile station 340. The scheduler 261 generates a DSA-ACK message to be transmitted by the use of the relay link. The transmission processing section 250 transmits the generated DSA-ACK message to the base station 100.

The receiving processing section 120 of the base station 100 receives the DSA-ACK message from the relay station 200. As a result, service flow establishment is completed. The scheduler 171 applies persistent scheduling and begins to transmit user data to or receive user data from the mobile station 340.

As has been described, when a service flow is established, that is to say, before transmitting or receiving user data is begun, the base station 100 determines whether to perform the persistent allocation of a radio resource to the mobile station 340. If the base station 100 performs the persistent allocation of a radio resource to the mobile station 340, then the base station 100 informs the relay station 200 about intervals as parameters included in a DSA-RSP message. As a result, the STID, the DL interval, and the UL interval are registered both in the schedule table 181 held in the base station 100 and in the schedule table held in the relay station 200.

Figure 9:
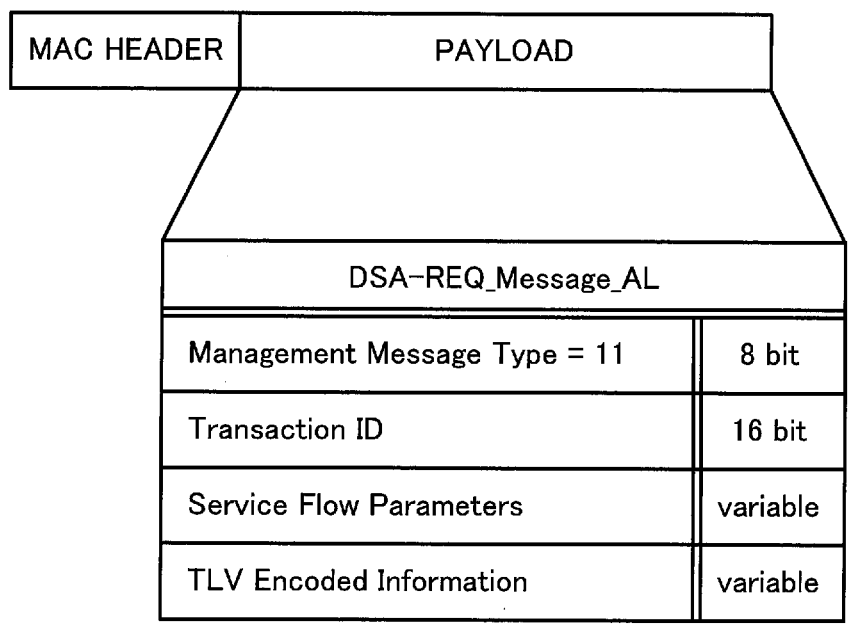
FIG. 9 is an example of the structure of a DSA-REQ message (AL)

FIG. 9 is an example of the structure of a DSA-REQ message (AL). A MAC-PDU having structure indicated in FIG. 9 is transmitted from the mobile station 340 to the relay station 200 in the above step S11. This MAC-PDU includes a MAC header and a payload. The contents of a DSA-REQ message (AL) are inserted into the payload.

The payload includes a management message type, transaction ID, service flow parameters, and TLV encoding information.

Management Message Type is a parameter indicative of a control message type and is represented by eight bits. With a DSA-REQ message Management Message Type is set to the fixed value "11". Transaction ID is identification information for identifying transaction of a service flow establishment process, and is represented by sixteen bits. The value of Transaction ID is determined by each of the mobile stations 310 through 360.

Service Flow Parameters are parameters referred to for service flow establishment and are variable-length parameters. Service Flow Parameters include, for example, a minimum reserved traffic rate and maximum latency. The details of Service Flow Parameters will be described later. TLV Encoding Information is other pieces of information regarding a service flow and is variable-length information. TLV Encoding Information includes, for example, a version of an IP protocol used.

Figure 10:
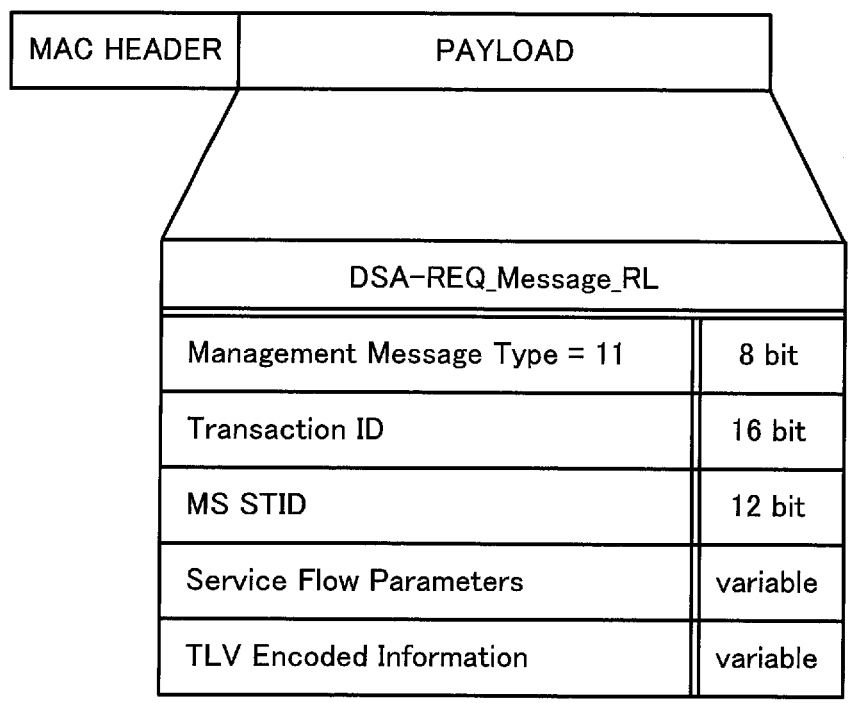
FIG. 10 is an example of the structure of a DSA-REQ message (RL)

FIG. 10 is an example of the structure of a DSA-REQ message (RL). A MAC-PDU having structure indicated in FIG. 10 is transmitted from the relay station 200 to the base station 100 in the above step S12. This MAC-PDU includes a MAC header and a payload. The contents of a DSA-REQ message (RL) are inserted into the payload.

The payload includes Management Message Type, Transaction ID, Mobile Station STID (MS STID), Service Flow Parameters, and TLV Encoding Information. The parameters other than Mobile Station STID are the same as those included in the above DSA-REQ message (AL).

Mobile Station STID is STID assigned to a mobile station which transmits a DSA-REQ message (AL), and is represented by twelve bits. When the relay station 200 receives a DSA-REQ message from a mobile station, the relay station 200 specifies the source mobile station by MAP information included in the same radio frame, and inserts STID of the specified mobile station into a DSA-REQ message (RL). The base station 100 can identify the source mobile station based on the STID included in the received DSA-REQ message (RL).

Figure 11:
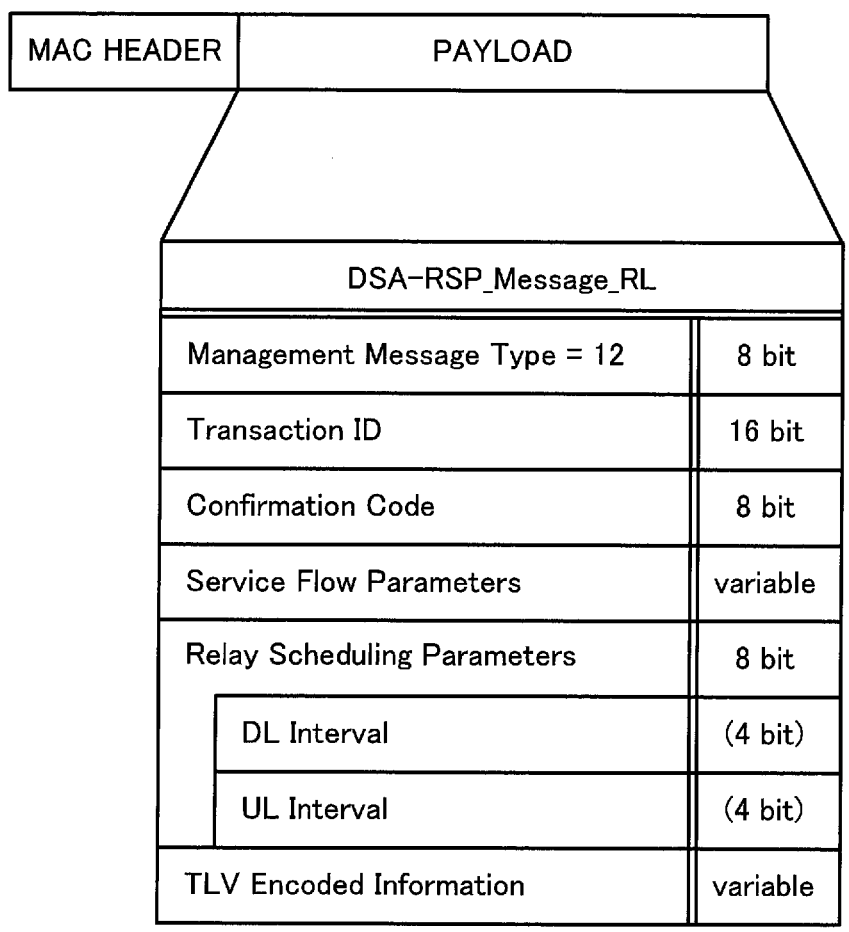
FIG. 11 is an example of the structure of a DSA-RSP message (RL)

FIG. 11 is an example of the structure of a DSA-RSP message (RL). A MAC-PDU having structure indicated in FIG. 11 is transmitted from the base station 100 to the relay station 200 in the above step S15. This MAC-PDU includes a MAC header and a payload. The contents of a DSA-RSP message (RL) are inserted into the payload.

The payload includes Management Message Type, Transaction ID, Confirmation Code, Service Flow Parameters, Relay Scheduling Parameters, and TLV Encoding Information.

As stated above, Management Message Type is a parameter indicative of a control message type and is represented by eight bits. With a DSA-RSP message Management Message Type is set to the fixed value "12". Transaction ID is set to a value which is the same as that of Transaction ID included in a DSA-REQ message (RL). Confirmation Code is a parameter which indicates whether a service flow is accepted or rejected, and is represented by eight bits. If a service flow is accepted, then Confirmation Code is set to "0". If a service flow is rejected, then Confirmation Code is set to a value other than "0".

As stated above, Service Flow Parameters are parameters referred to for service flow establishment and are variable-length parameters. However, Service Flow Parameters are inserted only if Confirmation Code is "0". Some of Service Flow Parameters are included in a DSA-REQ message (RL). However, the base station 100 may add Service Flow Parameters. For example, a parameter, such as jitter information, which is not designated clearly by a mobile station that requests a service and which is complemented by the base station 100 may be inserted.

Relay Scheduling Parameters indicate intervals at which radio resources for the relay link are assigned, and are represented by eight bits. Relay Scheduling Parameters include a DL interval and a UL interval each of which is represented by four bits. If persistent scheduling is not performed, then Relay Scheduling Parameters are set to "0". Relay Scheduling Parameters are inserted only if Confirmation Code is "0". TLV Encoding Information is the same as that included in the above DSA-REQ message (AL).

Figure 12:
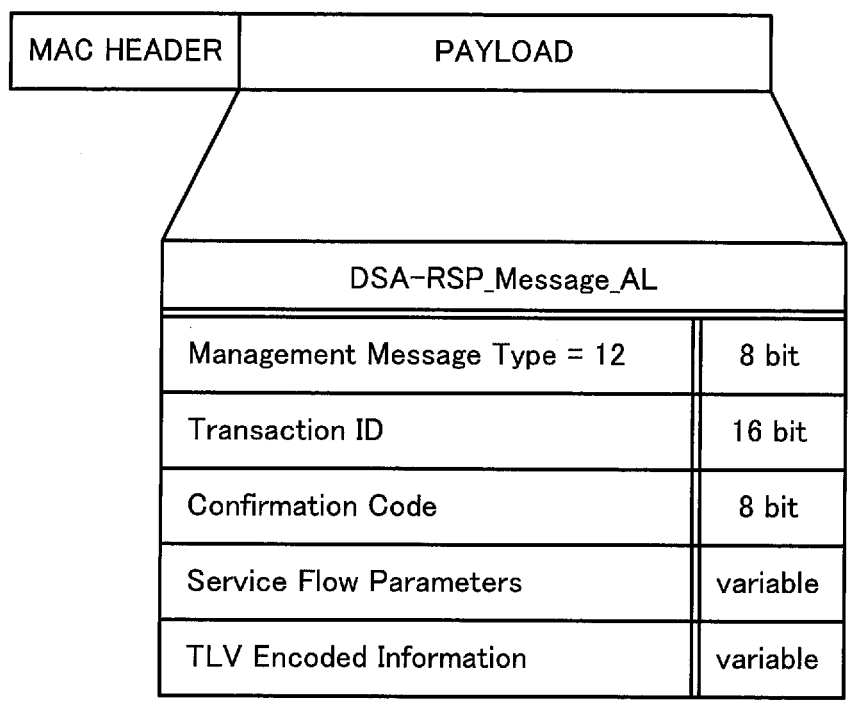
FIG. 12 is an example of the structure of a DSA-RSP message (AL)

FIG. 12 is an example of the structure of a DSA-RSP message (AL). A MAC-PDU having structure indicated in FIG. 12 is transmitted from the relay station 200 to the mobile station 340 in the above step S18. This MAC-PDU includes a MAC header and a payload. The contents of a DSA-RSP message (AL) are inserted into the payload.

The payload includes Management Message Type, Transaction ID, Confirmation Code, Service Flow Parameters, and TLV Encoding Information. These parameters are set to values which are the same as those of the parameters included in a DSA-RSP message (RL). Unlike a DSA-RSP message (RL), however, the DSA-RSP message (AL) does not include Relay Scheduling Parameters.

Figure 13:
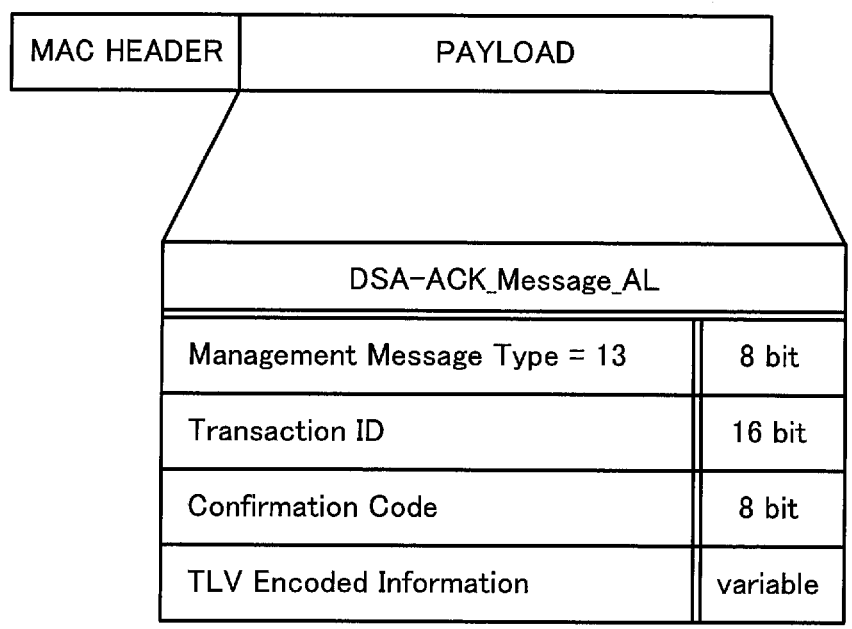
FIG. 13 is an example of the structure of a DSA-ACK message (AL)

FIG. 13 is an example of the structure of a DSA-ACK message (AL). A MAC-PDU having structure indicated in FIG. 13 is transmitted from the mobile station 340 to the relay station 200 in the above step S19. This MAC-PDU includes a MAC header and a payload. The contents of a DSA-ACK message (AL) are inserted into the payload.

The payload includes Management Message Type, Transaction ID, Confirmation Code, and TLV Encoding Information. A MAC-PDU transmitted from the relay station 200 to the base station 100 in the above step S20 can also be realized by adopting the same structure that is indicated in FIG. 13.

As stated above, Management Message Type is a parameter indicative of a control message type and is represented by eight bits. With a DSA-ACK message Management Message Type is set to the fixed value "13". Transaction ID is set to a value which is the same as that of Transaction ID included in a DSA-RSP message (AL). Confirmation Code is a parameter which indicates whether the contents of a DSA-RSP message are accepted or rejected, and is represented by eight bits. If the contents of a DSA-RSP message are accepted, then Confirmation Code is set to "0". If the contents of a DSA-RSP message are rejected, then Confirmation Code is set to a value other than "0". TLV Encoding Information is the same as that included in the above DSA-REQ message (AL).

FIG. 14 is an example of a service flow parameter. One or more combinations of a type number and a parameter value are set in the DSA-REQ messages indicated in FIGS. 9 and 10 and the DSA-RSP messages indicated in FIGS. 11 and 12. The correspondence between the meanings of a type number and a parameter value is determined in advance. FIG. 14 indicates an example of the meaning of a parameter value.

The type number "1" means service flow ID, that is to say, identification information for identifying each service flow. When a service flow is established, the base station 100 gives service flow ID. The type number "9" means a minimum reserved traffic rate, that is to say, a minimum traffic rate reserved for a service flow. The type number "14" means maximum latency, that is to say, the upper limit of transmission delay time which can be tolerated for a service flow. Each of the mobile stations 310 through 360 can designate a minimum reserved traffic rate and maximum latency at the time of establishing a service flow.

The type number "11" means an uplink grant scheduling type, that is to say, a type of a scheduling method in the direction of the mobile stations 310 through 360 to the base station 100. The type number "29" means a data delivery service type, that is to say, a type of a scheduling method in the direction of the base station 100 to the mobile stations 310 through 360. Each of the mobile stations 310 through 360 can designate an uplink grant scheduling type and a data delivery service type at the time of establishing a service flow.

Candidate uplink grant scheduling types and data delivery service types include, for example, UGS (Unsolicited Grant Service) and rtPS (real time Polling Service). The UGS means a scheduling method suitable for a service in which data transmission and receiving are performed periodically. The rtPS means a scheduling method suitable for a service in which data transmission and receiving are performed in real time.

Each of the mobile stations 310 through 360 designates, for example, the UGS or the rtPS according to a service type as an uplink grant scheduling type and a data delivery service type when it establishes a service flow. In the case of VoIP communication, the UGS may be designated both for the uplink and for the downlink. In addition, in the case of a moving image download service, the UGS may be designated only for the downlink.

Based on an uplink grant scheduling type and a data delivery service type, the scheduler 171 of the base station 100 determines whether to perform persistent scheduling on the relay link for each of the uplink and the downlink. For example, if the UGS is designated, then the scheduler 171 performs persistent scheduling. If persistent scheduling is performed, then the base station 100 may determine an interval by referring to a minimum reserved traffic rate and maximum latency designated by each of the mobile stations 310 through 360.

Figure 15:
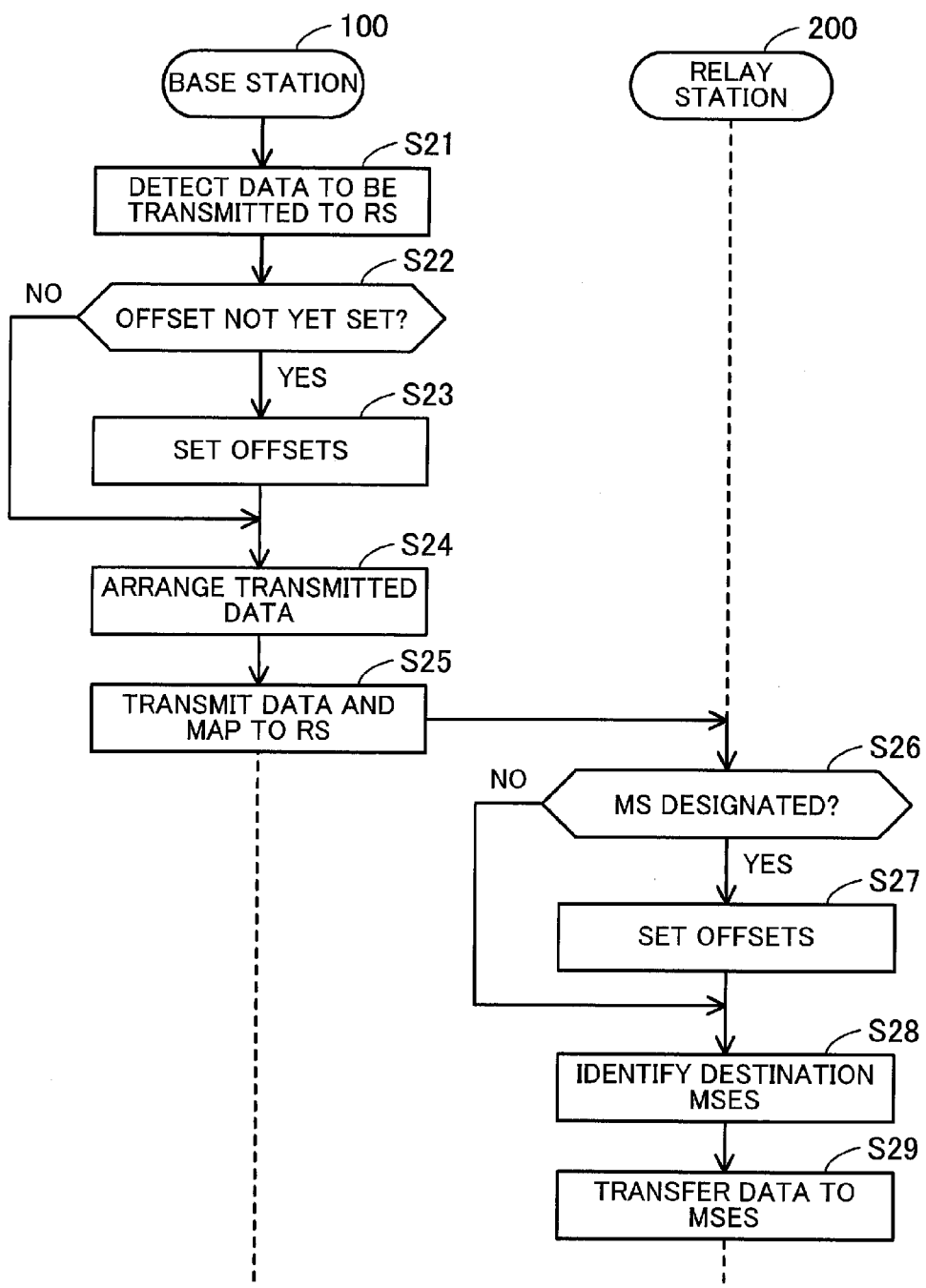
FIG. 15 is a flow chart of a DL data transmission process.

FIG. 15 is a flow chart of a DL data transmission process. The process illustrated in FIG. 15 will now be described in order of step number.

(Step S21) The scheduler 171 of the base station 100 detects that user data to be transmitted to the relay station 200, that is to say, user data destinations of which are mobile stations that make a connection to the relay station 200 and that establish service flows is stored in the packet buffer 152.

(Step S22) The scheduler 171 of the base station 100 refers to the schedule table 181 stored in the storage section 180, and determines whether among the mobile stations which are destinations of the user data, there is a mobile station for which intervals are already set and for which offsets are not yet set. A case where offset are not yet set may arise after the establishment of a service flow and before the beginning of the transfer of data. If there is a mobile station for which offsets are not yet set, then the scheduler 171 proceeds to step S23. If offsets are already set for all the mobile stations, then the scheduler 171 proceeds to step S24.

(Step S23) The scheduler 171 of the base station 100 specifies a subframe to which a DL radio resource assigned to the mobile station for which an offset is not yet set belongs. The scheduler 171 then calculates an offset of the specified subframe and considers it as a DL offset. In addition, the scheduler 171 calculates an offset of a subframe a determined number of subframes after the subframe to which the assigned DL radio resource belongs, and considers it as a UL offset. The scheduler 171 then registers the DL offset and the UL offset in the schedule table 181. If at this time a group which is equal to the mobile station in interval and offset is already in existence, then the scheduler 171 makes the mobile station belong to this group. If a group which is equal to the mobile station in interval and offset is not in existence, then the scheduler 171 makes the mobile station belong to a new group.

(Step S24) The scheduler 171 of the base station 100 compares DL intervals and DL offsets registered in the schedule table 181 with a current frame number and a current subframe number, and selects a schedule information group to be applied. The scheduler 171 then arranges user data to be transmitted by the same subframe in order indicated by the selected schedule information group. For example, order in which user data destinations of which are a plurality of mobile stations is arranged conforms to order in which these mobile stations are registered in the schedule table 181, that is to say, the order of records in the schedule table 181.

(Step S25) The transmission processing section 160 of the base station 100 concatenates a plurality of MAC-PDUs including the user data into one HARQ block based on the arrangement result in step S24 and transmits it. If offsets are set in step S23, the transmission processing section 160 transmits MAP information including STID of the mobile station for which the offsets are set by the same subframe that includes the HARQ block. MAC-PDUs for a service flow to which persistent scheduling is not applied are transmitted in accordance with ordinary scheduling.

(Step S26) The receiving processing section 220 of the relay station 200 receives the MAP information and the HARQ block transmitted by the base station 100. The scheduler 261 determines whether or not the MAP information includes STID of a mobile station for which offsets are set. If the MAP information includes STID of a mobile station for which offsets are set, then the scheduler 261 proceeds to step S27. If the MAP information does not include STID of a mobile station for which offsets are set, then step S28 is performed.

(Step S27) The scheduler 261 of the relay station 200 calculates a DL offset and a UL offset from a frame number and a subframe number at MAP information receiving time. The scheduler 261 then registers the calculated DL offset and UL offset associated with the STID included in the MAP information in the schedule table stored in the storage section 270. If at this time a group which is equal to the mobile station in interval and offset is already in existence, then the scheduler 261 makes the mobile station belong to this group. If a group which is equal to the mobile station in interval and offset is not in existence, then the scheduler 261 makes the mobile station belong to a new group.

(Step S28) The PDU buffer 241 of the relay station 200 compares DL intervals and DL offsets registered in the schedule table stored in the storage section 270 with a frame number and a subframe number at HARQ block receiving time, and selects a schedule information group to be applied. Based on the order of a plurality of mobile stations indicated by the selected schedule information group, the PDU buffer 241 then identifies a destination mobile station of each MAC-PDU included in the HARQ block.

(Step S29) The PDU buffer 241 of the relay station 200 separates the MAC-PDUs which are included in the HARQ block according to destination mobile stations. The transmission processing section 250 transfers a HARQ block including a MAC-PDU a destination of which is each mobile station to it.

As has been described, when the base station 100 performs downlink communication first after service flow establishment, the base station 100 sets a DL offset and a UL offset. The base station 100 then transmits MAP information. By doing so, the base station 100 informs the relay station 200 about DL offset timing. As a result, the DL offset and the UL offset are registered in the schedule tables held by the base station 100 and the relay station 200 and a group to which each mobile station belongs is determined. After that, MAC-PDU transfer timing in the downlink communication is controlled based on a DL interval and the DL offset. In addition, MAC-PDU transfer timing in uplink communication is controlled based on a UL interval and the UL offset.

The MAP information includes DL-MAP information and UL-MAP information. A mobile station which performs persistently scheduled data transfer by the use of the downlink is specified by STID included in the DL-MAP information. A mobile station which performs persistently scheduled data transfer by the use of the uplink is specified by STID included in the UL-MAP information.

With a service in which both of downlink communication and uplink communication are performed, DL-MAP information and UL-MAP information each including STID of a mobile station can be transmitted by the same subframe. However, DL-MAP information and UL-MAP information each including STID of a mobile station can be transmitted by different subframes. With a service in which only downlink communication is performed, only DL-MAP information including STID may be transmitted. With a service in which only uplink communication is performed, the base station 100 may transmit only UL-MAP information including STID when the base station 100 informs the relay station 200 about an assigned radio resource for the relay link.

In the second embodiment, an interval is set at the time of service flow establishment and an offset is set at the time of the beginning of a data transfer between the base station 100 and the relay station 200. The former has the advantage of easily giving notice of a control message including an interval. The latter has the advantage of being capable of performing efficient scheduling with a radio resource use state at data transfer time taken into consideration. However, both of an interval and an offset may be set at the time of service flow establishment. Furthermore, both of an interval and an offset may be set at the time of beginning a data transfer in accordance with a service flow.

Figure 16:
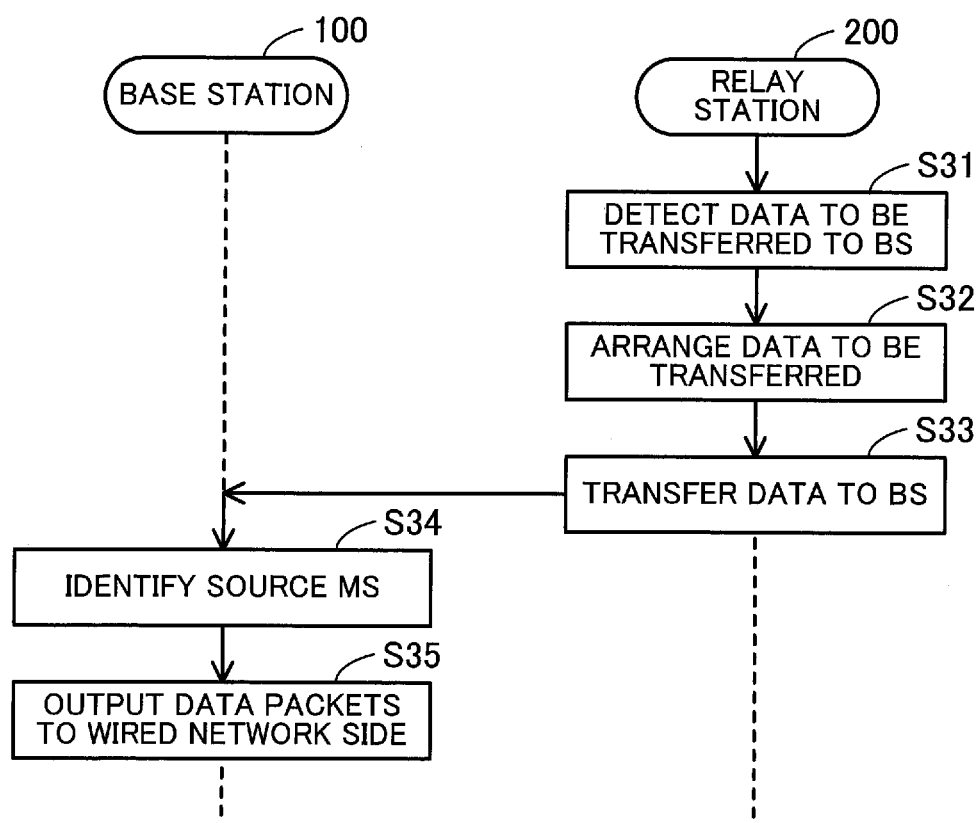
FIG. 16 is a flow chart of a UL data transmission process.

FIG. 16 is a flow chart of a UL data transmission process. It is assumed that the base station 100 has already informed the relay station 200 about an assigned radio resource for the uplink. The process illustrated in FIG. 16 will now be described in order of step number.

(Step S31) The scheduler 261 of the relay station 200 detects that MAC-PDUs to be transferred to the base station 100, that is to say, MAC-PDUs received from mobile stations which make a connection to the relay station 200 and which establish service flows are stored in the PDU buffer 241.

(Step S32) The scheduler 261 of the relay station 200 compares UL intervals and UL offsets registered in the schedule table stored in the storage section 270 with a current frame number and a current subframe number, and selects a schedule information group to be applied. The scheduler 261 then arranges MAC-PDUs to be transmitted by the same subframe in order indicated by the selected schedule information group. For example, order in which MAC-PDUs received from a plurality of mobile stations are arranged conforms to order in which these mobile stations are registered in the schedule table.

(Step S33) The transmission processing section 250 of the relay station 200 concatenates the plurality of MAC-PDUs to be transferred by the use of the relay link into one HARQ block based on the arrangement result in step S32, and transmits it. MAC-PDUs for a service flow to which persistent scheduling is not applied are transferred in accordance with ordinary scheduling.

(Step S34) The receiving processing section 120 of the base station 100 receives the HARQ block transmitted by the relay station 200. The packet generation section 132 compares UL intervals and UL offsets registered in the schedule table 181 stored in the storage section 180 with a frame number and a subframe number at HARQ block receiving time, and selects a schedule information group to be applied. Based on the order of a plurality of mobile stations indicated by the selected schedule information group, the packet generation section 132 then identifies a source mobile station of each MAC-PDU included in the HARQ block.

(Step S35) The packet generation section 132 of the base station 100 separates the MAC-PDUs which are transmitted from the mobile stations and which are included in the HARQ block, and converts the MAC-PDUs to a proper packet format. The network interface 141 outputs data packets after the conversion to the wired network side.

As has been described, MAC-PDU transfer timing in the uplink communication is controlled based on UL intervals and UL offsets registered in the schedule tables held by the base station 100 and the relay station 200.

FIG. 17 is an example of the structure of MAP information. DL-MAP information having structure indicated in FIG. 17 is transmitted from the base station 100 to the relay station 200 in the above step S25. The DL-MAP information includes RS STID, Length, Group ID, Modulation and Coding Scheme, Number of Allocated MSes, MS STID, Number of De-allocated MSes, MS STID, Subchannel Offset, and Number of Subchannels.

RS STID is identification information for identifying the relay station 200 to which the DL-MAP information is transmitted, and has variable length. Length is the length of the DL-MAP information and has variable length. Group ID is group ID included in the schedule table 181, and is represented by five bits. MAC-PDUs destinations of which are mobile stations that belong to the same group are included in the same HARQ block. However, MAC-PDUs destinations of which are mobile stations that belong to different groups are not included in the same HARQ block. Modulation and Coding Scheme is a modulation and coding scheme applied to a HARQ block, and is represented by four bits.

Number of Allocated MSes is the number of mobile stations added to a group indicated by Group ID, and is represented by three bits. MS STID is identification information for identifying each mobile station added to a group, and each mobile station is represented by twelve bits. Number of De-allocated MSes is the number of mobile stations deleted from a group indicated by Group ID, and is represented by three bits. MS STID is identification information for identifying each mobile station deleted from a group, and each mobile station is represented by twelve bits.

Subchannel Offset is the leading position in a subchannel direction (that is to say, frequency direction) of a HARQ block in a subframe and is represented by seven bits. Number of Subchannels is the number of subchannels (that is to say, frequency band) used by a HARQ block, and is represented by seven bits. The range of a radio resource used by a HARQ block can be specified by Subchannel Offset and Number of Subchannels.

The DL-MAP information indicated in FIG. 17 is transmitted according to group ID. UL-MAP information can also be realized by adopting the same data structure that the DL-MAP information has. The details of service flow deletion will be described later.

Figure 18:
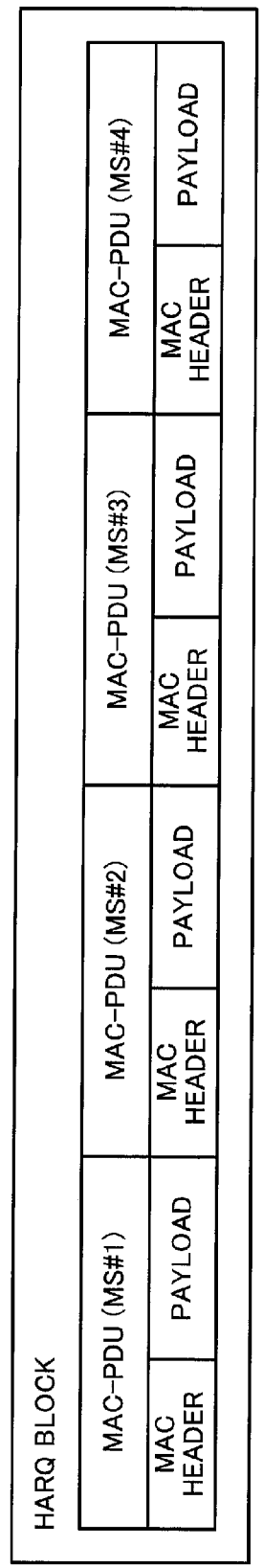
FIG. 18 is a first example of the structure of a HARQ block.

FIG. 18 is a first example of the structure of a HARQ block. As indicated in FIG. 7, the mobile stations 310 through 340 (MS#1 through MS#4) belong to the same group, so MAC-PDUs corresponding to the mobile stations 310 through 340 which are transmitted by the use of the relay link are included in the same HARQ block.

Order in which the MAC-PDUs corresponding to the mobile stations 310 through 340 are arranged is determined by the schedule tables held by the base station 100 and the relay station 200. That is to say, in accordance with the order indicated in FIG. 7, the MAC-PDU corresponding to the mobile station 310 is placed at the head of the HARQ block, the MAC-PDU corresponding to the mobile station 320 is placed second in the HARQ block, the MAC-PDU corresponding to the mobile station 330 is placed third in the HARQ block, and the MAC-PDU corresponding to the mobile station 340 is placed last in the HARQ block. If the mobile stations 310 through 340 are registered in the schedule tables in the order of the mobile stations 310, 330, 340, and 320, then the MAC-PDUs corresponding to the mobile stations 310 through 340 are arranged in that order. Order in which MAC-PDUs are arranged changes at the time of the beginning or termination of a service flow.

The base station 100 or the relay station 200 which receives such a HARQ block by the relay link refers to the schedule table. By doing so, the base station 100 or the relay station 200 can identify a mobile station corresponding to each MAC-PDU. Accordingly, as illustrated in FIG. 18, there is no need to transmit a HARQ block including STID of a mobile station.

FIGS. 19A and 19B are second examples of the structure of a HARQ block. FIGS. 19A and 19B are examples of a HARQ block which does not include user data to be transmitted by the use of the relay link that corresponds to a part or all of mobile stations included in a group.

In the example of FIG. 19A, only a MAC header is placed at a position in a HARQ block corresponding a mobile station for which there is no data to be transmitted. A MAC header includes service flow ID and payload length. If there is no user data to be transmitted, then payload length is set to "0" (zero). As a result, the base station 100 or the relay station 200 which receives the HARQ block checks the payload length and the schedule table and can identify a mobile station for which there is no user data to be transmitted or received.

In the example of FIG. 19B, a bit map is placed at the head of a HARQ block as an extension header. One bit in the bit map is assigned to each mobile station included in a group and the bit length corresponds to the number of mobile stations included in the group. For example, "1" means that there is user data, and "0" means that there is no user data.

The order of bits in a bit map corresponds to the order of MAC-PDUs. For example, the bit map "1101" means that there is no user data corresponding to the mobile station 330 (MA#3). As a result, the base station 100 or the relay station 200 which receives the HARQ block checks the extension header and the schedule table and can identify a mobile station for which there is no user data to be transmitted or received.

If the method of FIG. 19B is used, an extension header may be added only to a HARQ block in which there is a mobile station for which there is no user data, or be added to all HARQ blocks.

FIGS. 20A and 20B are third examples of the structure of a HARQ block. FIGS. 20A and 20B are examples of a HARQ block by which a MAC-PDU corresponding to a mobile station to which persistent scheduling is not applied is to be transmitted by the use of the relay link. It is assumed that persistent scheduling is not applied to any of the mobile stations 310 through 360 and that one HARQ block including MAC-PDUs corresponding to the mobile stations 310, 320, and 340 is transmitted.

In the example of FIG. 20A, STIDs for the mobile stations 310, 320, and 340 are placed at the head of a HARQ block as an extension header. The order of the three STIDs corresponds to the order of the three MAC-PDUs. As a result, the base station 100 or the relay station 200 which receives the HARQ block checks the extension header and can identify a destination or source mobile station of each MAC-PDU.

In the example of FIG. 20B, a bit map is placed at the head of a HARQ block as an extension header. One bit in the bit map is assigned to each mobile station which makes a connection to the relay station 200. For example, "1" means that there is a MAC-PDU, and "0" means that there is no MAC-PDU. Agreement on the correspondence between the order of bits in a bit map and mobile stations is gotten in advance between the base station 100 and the relay station 200. As a result, the base station 100 or the relay station 200 which receives the HARQ block checks the extension header and can identify a destination or source mobile station of each MAC-PDU.

With the method of FIG. 20A, however, the bit length of the extension header is (number of bits used for STID (12 bits, for example) x number of MAC-PDUs included in HARQ block) and tends to increase. With the method of FIG. 20B, the bit length of the extension header is the number of mobile stations which makes a connection to the relay station 200. Accordingly, the bit length increases with an increase in the number of mobile stations which makes a connection to the relay station 200.

Even if MAC-PDUs corresponding to mobile stations to which persistent scheduling is not applied are transmitted by the use of the relay link, they should be combined into the smallest possible number of HARQ blocks. This is advantageous from the viewpoint of transmission efficiency. The reason for this is that as the number of HARQ blocks decreases, the data amount of MAC information decreases. In order to improve transmission efficiency, many MAC-PDUs should be combined into one HARQ block especially in communication, such as VoIP communication, in which the data amount of one MAC-PDU is small.

Figure 21:
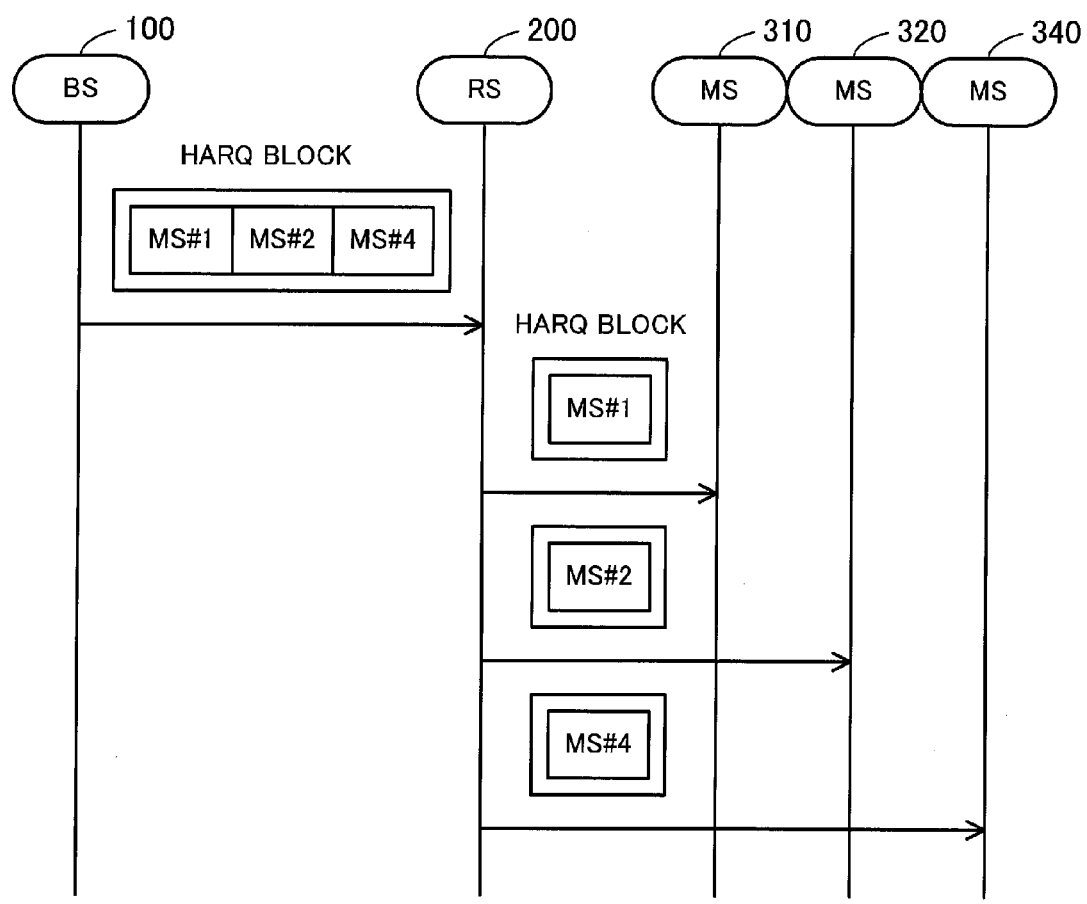
FIG. 21 indicates the relationship between HARQ blocks before and after DL relay.

FIG. 21 indicates the relationship between HARQ blocks before and after DL relay. It is assumed that the base station 100 transmits user data to the mobile stations 310, 320, and 340.

The relay station 200 receives a HARQ block including MAC-PDUs destinations of which are the mobile stations 310, 320, and 340 from the base station 100 by the use of the relay link. The relay station 200 refers to the schedule table, identifies the destination mobile stations of the MAC-PDUs, and separates the MAC-PDUs.

The relay station 200 then places the MAC-PDU the destination of which is the mobile station 310 in one HARQ block and transmits the HARQ block to the mobile station 310 by the use of the access link. The relay station 200 places the MAC-PDU the destination of which is the mobile station 320 in one HARQ block and transmits the HARQ block to the mobile station 320. The relay station 200 places the MAC-PDU the destination of which is the mobile station 340 in one HARQ block and transmits the HARQ block to the mobile station 340.

Figure 22:
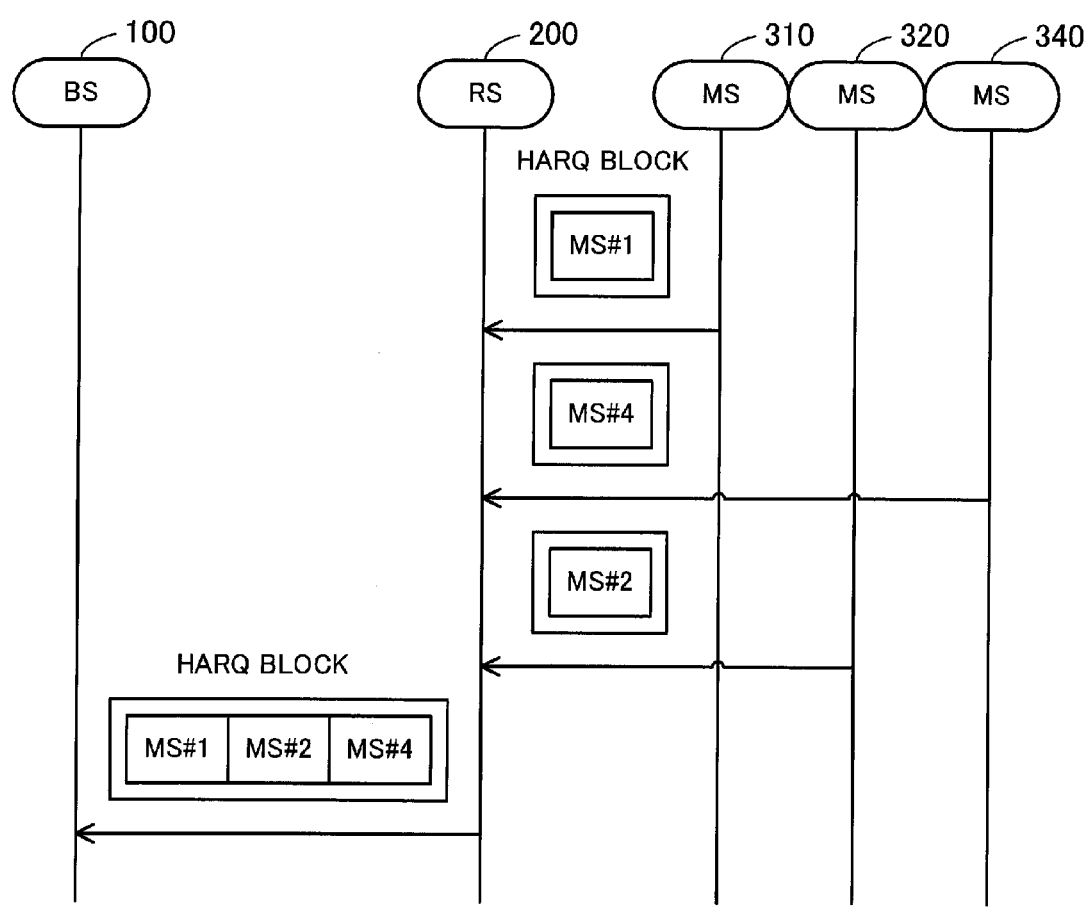
FIG. 22 indicates the relationship between HARQ blocks before and after UL relay.

FIG. 22 indicates the relationship between HARQ blocks before and after UL relay. It is assumed that the mobile stations 310, 320, and 340 transmit user data to the base station 100.

The relay station 200 receives a HARQ block including a MAC-PDU from the mobile station 310 by the use of the access link. The relay station 200 receives a HARQ block including a MAC-PDU from the mobile station 340 by the use of the access link. The relay station 200 receives a HARQ block including a MAC-PDU from the mobile station 320 by the use of the access link.

The relay station 200 then refers to the schedule table, rearranges the three MAC-PDUs, and concatenates them. For example, the relay station 200 arranges the MAC-PDU transmitted from the mobile station 310, the MAC-PDU transmitted from the mobile station 320, and the MAC-PDU transmitted from the mobile station 340 in that order. After that, the relay station 200 transmits a HARQ block including the three MAC-PDUs to the base station 100 by the use of the relay link.

Figure 23:
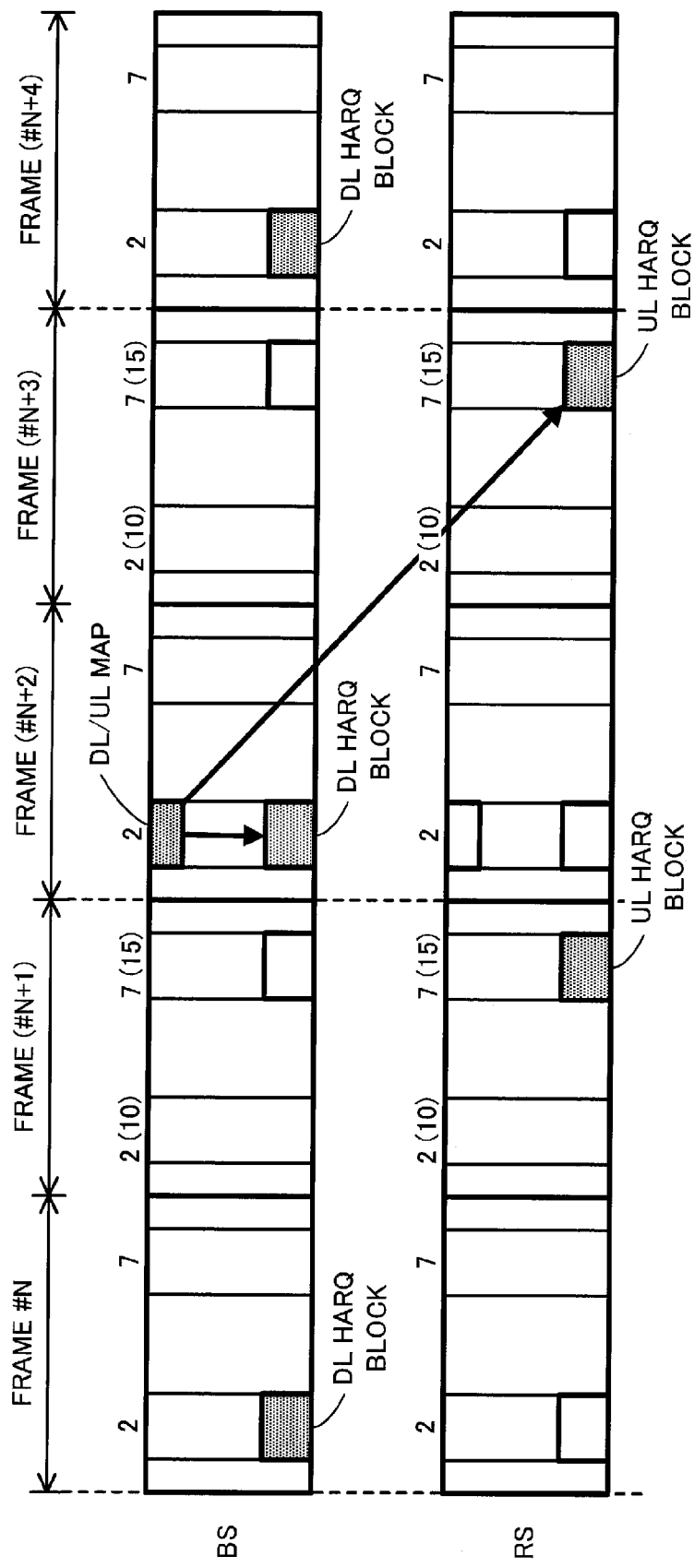
FIG. 23 is an example of scheduling.

FIG. 23 is an example of scheduling. It is assumed that the mobile stations 310 through 330 perform communication under the condition that DL interval=UL interval=16 subframes, UL offset=2, and DL offset=15, and that the mobile station 340 is added to the same group that is formed by the mobile stations 310 through 330.

In this example, the DL interval and the UL interval are 16 subframes (that is to say, 2 frames), so subframes #0 in frames #N, (#N+2), (#N+4), and so on (N is even) are defined as reference subframes. Accordingly, a HARQ block including MAC-PDUs destinations of which are the mobile stations 310 through 330 is transmitted from the base station 100 to the relay station 200 by a subframe #2 in the frame #N. In addition, a HARQ block including MAC-PDUs transmitted from the mobile stations 310 through 330 is transmitted from the relay station 200 to the base station 100 by a subframe #7 in a frame (#N+1).

The mobile station 340 is added to the group and DL-MAP information and UL-MAP information which indicate that the mobile station 340 is added to the group are transmitted by a subframe #2 in the frame (#N+2). As a result, schedule information after update is applied to the downlink communication from the subframe #2 in the frame (#N+2) by which the DL-MAP information is transmitted. That is to say, a HARQ block including MAC-PDUs destinations of which are the mobile stations 310 through 340 is transmitted from the base station 100 to the relay station 200 by the subframe #2 in the frame (#N+2).

In addition, the schedule information after the update is applied to the uplink communication from a subframe a determined number of subframes after the subframe #2 in the frame (#N+2) by which the UL-MAP information is transmitted. In this example, a HARQ block including MAC-PDUs transmitted from the mobile stations 310 through 340 is transmitted from the relay station 200 to the base station 100 by a subframe #7 in a frame (#N+3). A HARQ block including MAC-PDUs destinations of which are the mobile stations 310 through 340 is then transmitted from the base station 100 to the relay station 200 by a subframe #2 in the frame (#N+4). After that, MAC-PDUs corresponding to the mobile stations 310 through 340 are transmitted or received periodically.

Figure 24:
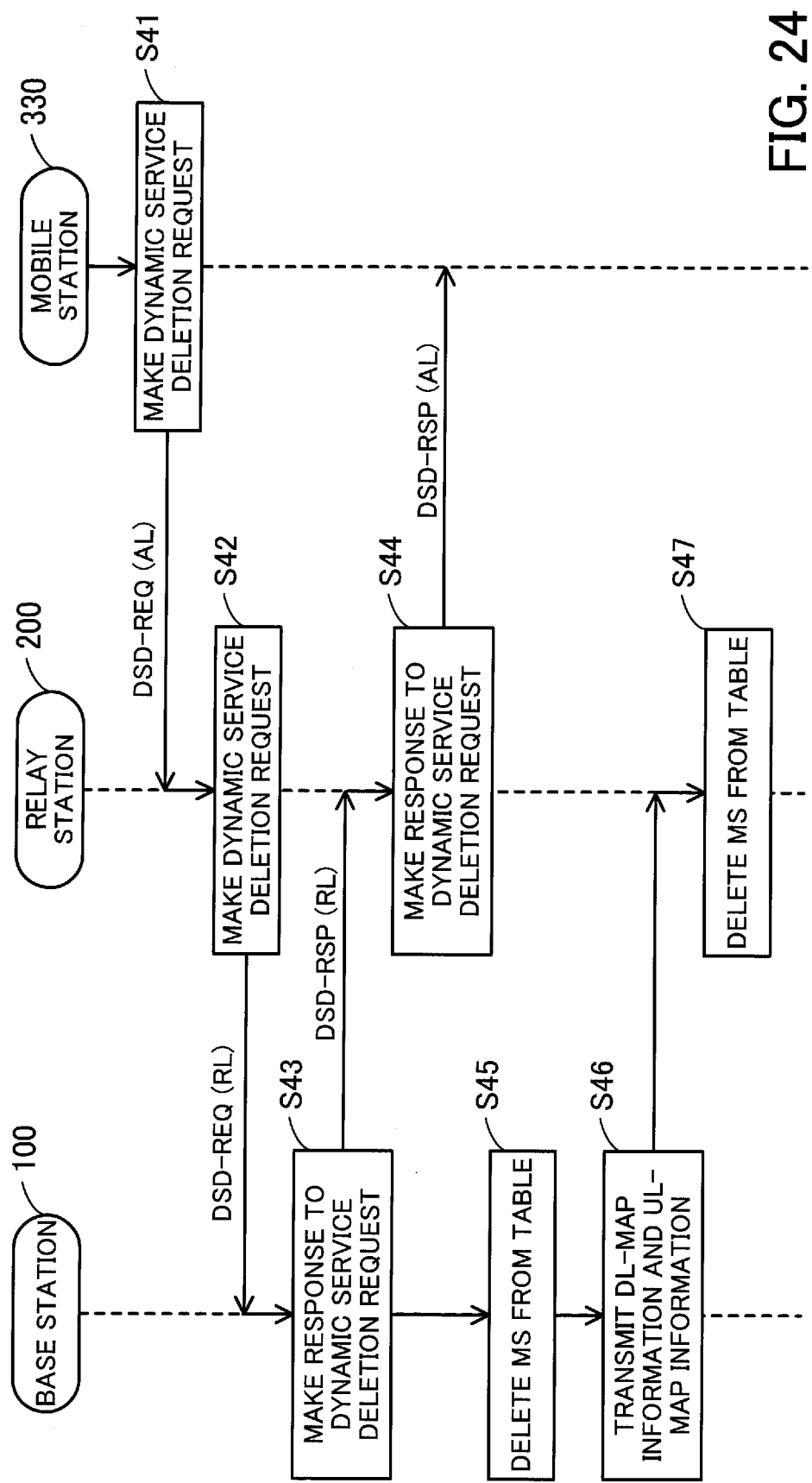
FIG. 24 is a flow chart of a service deletion process.

FIG. 24 is a flow chart of a service deletion process. It is assumed that a service flow is deleted in response to a request from the mobile station 330. The process illustrated in FIG. 24 will now be described in order of step number.

(Step S41) The mobile station 330 transmits a dynamic service deletion request message (DSD-REQ message) to the relay station 200 by the use of the access link. The DSD-REQ message transmitted by the mobile station 330 includes parameters such as service flow ID.

(Step S42) The receiving processing section 220 of the relay station 200 receives the DSD-REQ message from the mobile station 330. The scheduler 261 generates a DSD-REQ message to be transmitted by the use of the relay link based on the acquired DSD-REQ message. The transmission processing section 250 transmits the generated DSD-REQ message to the base station 100. Parameters which are not included in the message transmitted from the mobile station 330 are added to the DSD-REQ message transmitted to the base station 100.

(Step S43) The receiving processing section 120 of the base station 100 receives the DSD-REQ message from the relay station 200. Based on the acquired DSD-REQ message, the scheduler 171 generates a message (DSD-RSP message) of a response to the dynamic service deletion request. The transmission processing section 160 transmits the generated DSD-RSP message to the relay station 200 by the use of the relay link.

(Step S44) The receiving processing section 220 of the relay station 200 receives the DSD-RSP message from the base station 100. Based on the acquired DSD-RSP message, the scheduler 261 generates a DSD-RSP message to be transmitted by the use of the access link. The transmission processing section 250 transmits the generated DSD-RSP message to the mobile station 330.

The mobile station 330 receives the DSD-RSP message from the relay station 200. If a service flow is deleted, there is no need for the mobile station 330 to transmit to the relay station 200 an acknowledgement message to the effect that the mobile station 330 has received the DSD-RSP message.

(Step S45) The scheduler 171 of the base station 100 makes a search by the use of STID of the mobile station 330 in order to check whether or not schedule information is registered. If schedule information for the mobile station 330 is registered, then the scheduler 171 deletes the schedule information for the mobile station 330 from the schedule table 181. Schedule information registered in lines under the deleted schedule information is moved up.

(Step S46) The scheduler 171 of the base station 100 generates DL-MAP information and UL-MAP information each including the STID of the mobile station 330 as STID of mobile stations for which a persistently scheduled data transfer terminates. The transmission processing section 160 transmits the DL-MAP information and the UL-MAP information to the relay station 200. However, if a persistently scheduled data transfer is performed only by the use of the downlink, then the transmission processing section 160 may transmit only the DL-MAP information. If a persistently scheduled data transfer is performed only by the use of the uplink, then the transmission processing section 160 may transmit only the UL-MAP information.

(Step S47) The receiving processing section 220 of the relay station 200 receives the DL-MAP information and the UL-MAP information (or one of them) from the base station 100. The scheduler 261 checks whether or not STID of a mobile station for which a persistently scheduled data transfer terminates is included in the DL-MAP information or the UL-MAP information. If STID of a mobile station for which a persistently scheduled data transfer terminates is included in the DL-MAP information or the UL-MAP information, then the scheduler 261 deletes schedule information for the mobile station (mobile station 330) from the schedule table stored in the storage section 270. Schedule information registered in lines under the deleted schedule information is moved up.

As has been described, after the base station 100 and the relay station 200 delete the service flow, the base station 100 and the relay station 200 delete the schedule information for the mobile station 330 from the schedule tables. As a result, after that a persistently scheduled data transfer is not performed between the base station 100 and the relay station 200 for a MAC-PDU transmitted or received by the mobile station 330. In the example of FIG. 24, after the service flow is deleted, the schedule information is deleted. However, schedule information may be deleted while a service flow is being deleted. For example, a DSD-RSP message transmitted from the base station 100 to the relay station 200 may include a parameter for giving instructions to delete schedule information.

Figure 25:
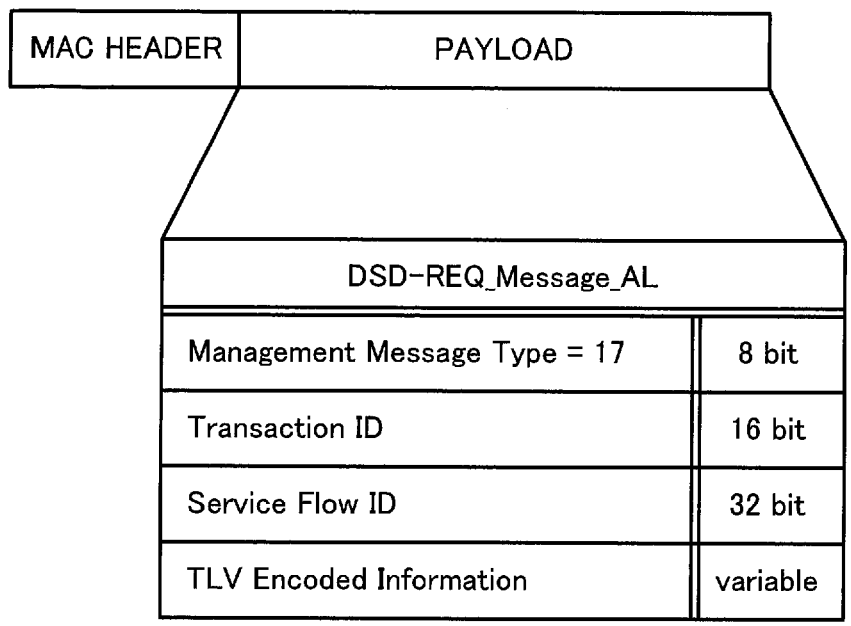
FIG. 25 is an example of the structure of a DSD-REQ message (AL)

FIG. 25 is an example of the structure of a DSD-REQ message (AL). A MAC-PDU having structure indicated in FIG. 25 is transmitted from the mobile station 330 to the relay station 200 in the above step S41. This MAC-PDU includes a MAC header and a payload. The contents of a DSD-REQ message (AL) are inserted into the payload.

The payload includes Management Message Type, Transaction ID, Service Flow ID, and TLV Encoding Information.

Management Message Type is a parameter indicative of a control message type and is represented by eight bits. With a DSD-REQ message Management Message Type is set to the fixed value "17". Transaction ID is identification information for identifying transaction of a service flow deletion process, and is represented by sixteen bits. The value of Transaction ID is determined by each of the mobile stations 310 through 360. Service Flow ID is identification information given to a service flow by the base station 100 at the time of service flow establishment, and is represented by thirty-two bits. TLV Encoding Information is other pieces of information regarding a service flow and is variable-length information.

Figure 26:
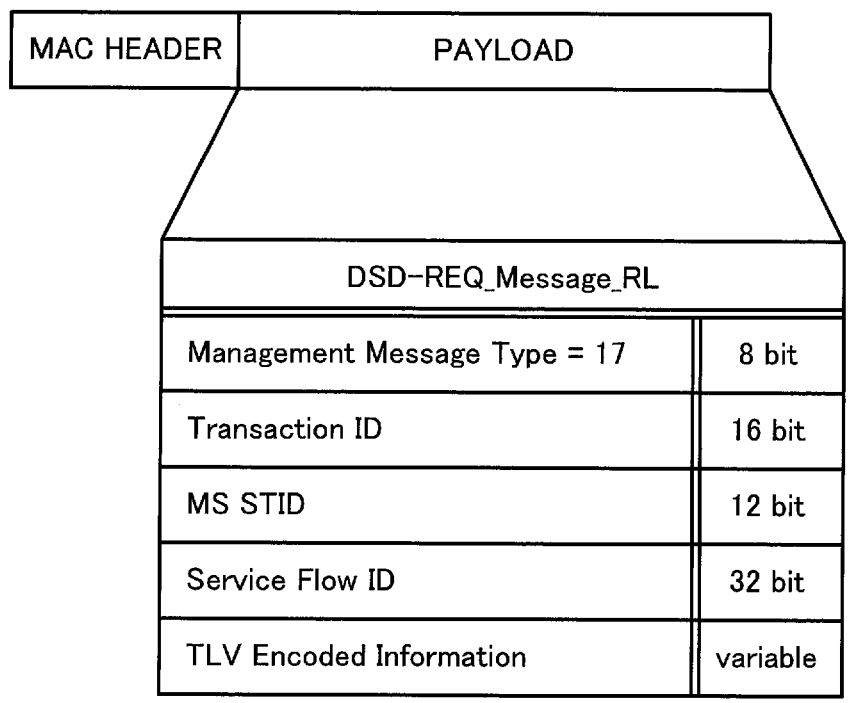
FIG. 26 is an example of the structure of a DSD-REQ message (RL)

FIG. 26 is an example of the structure of a DSD-REQ message (RL). A MAC-PDU having structure indicated in FIG. 26 is transmitted from the relay station 200 to the base station 100 in the above step S42. This MAC-PDU includes a MAC header and a payload. The contents of a DSD-REQ message (RL) are inserted into the payload.

The payload includes Management Message Type, Transaction ID, Mobile Station STID (MS STID), Service Flow ID, and TLV Encoding Information. The parameters other than Mobile Station STID are the same as those included in the above DSD-REQ message (AL).

Mobile Station STID is STID assigned to a mobile station which transmits a DSD-REQ message (AL), and is represented by twelve bits. When the relay station 200 receives a DSD-REQ message from a mobile station, the relay station 200 specifies the source mobile station by MAP information included in the same radio frame, and inserts STID of the specified mobile station into a DSD-REQ message (RL). The base station 100 can identify the source mobile station based on the STID included in the received DSD-REQ message (RL).

Figure 27:
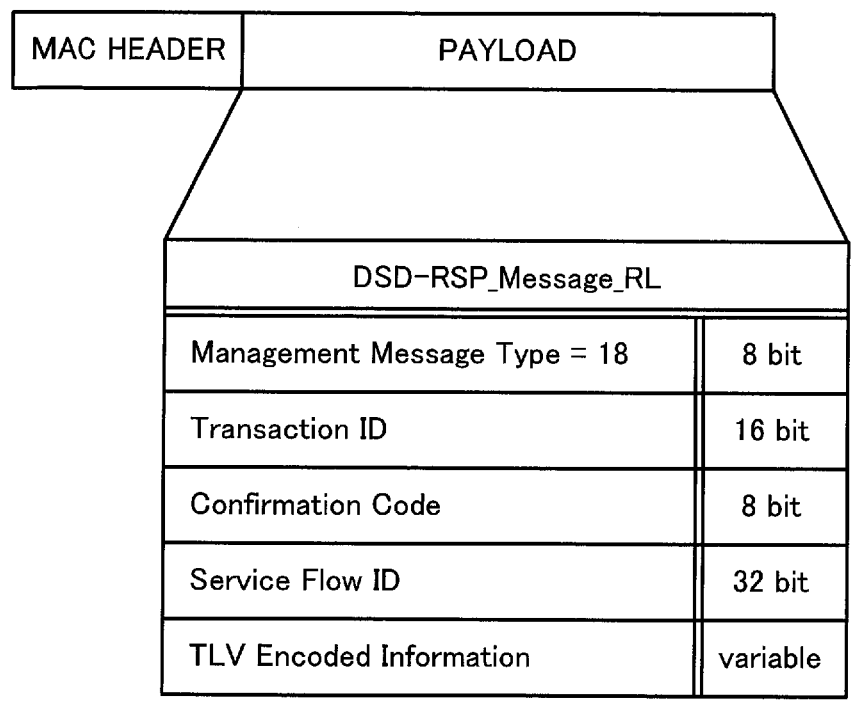
FIG. 27 is an example of the structure of a DSD-RSP message (RL)

FIG. 27 is an example of the structure of a DSD-RSP message (RL). A MAC-PDU having structure indicated in FIG. 27 is transmitted from the base station 100 to the relay station 200 in the above step S43. This MAC-PDU includes a MAC header and a payload. The contents of a DSD-RSP message (RL) are inserted into the payload.

The payload includes Management Message Type, Transaction ID, Confirmation Code, Service Flow ID, and TLV Encoding Information. A DSD-RSP message (AL) transmitted from the relay station 200 to the mobile station 330 in the above step S44 includes the same parameters that the DSD-RSP message (RL) includes.

As stated above, Management Message Type is a parameter indicative of a control message type and is represented by eight bits. With a DSD-RSP message Management Message Type is set to the fixed value "18". Transaction ID is set to a value which is the same as that of Transaction ID included in a DSD-REQ message (RL). Confirmation Code is a parameter which indicates whether a service flow can be deleted, and is represented by eight bits. As stated above, Service Flow ID is identification information for a service flow and is variable-length information. TLV Encoding Information is the same as that included in the above DSD-REQ message (AL).

In the above description the mobile station 310 through 360 side requests to begin or delete a service flow. However, the base station 100 side may request to start or delete a service flow. For example, there may be a case where one of the mobile station 310 through 360 receives a call from another mobile station.

Figure 28:
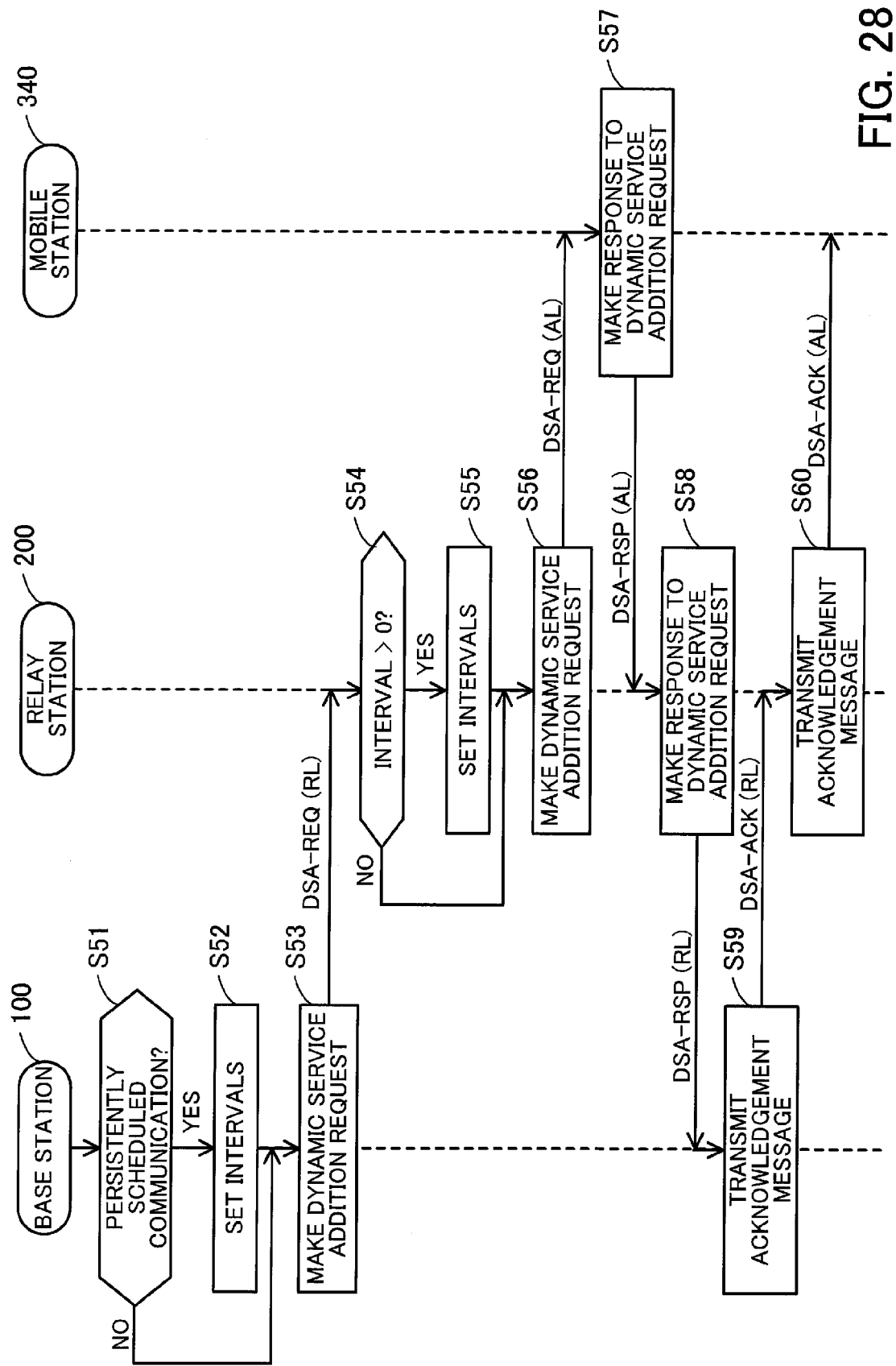
FIG. 28 is a flow chart of another example of a service addition process.

FIG. 28 is a flow chart of another example of a service addition process. It is assumed that the base station 100 requests the mobile station 340 to start a service flow. The process illustrated in FIG. 28 will now be described in order of step number.

(Step S51) The scheduler 171 of the base station 100 determines whether or not it is preferable to perform the persistent allocation of a radio resource to communication performed in accordance with a service flow which the mobile station 340 starts. Whether or not it is preferable to perform the persistent allocation of a radio resource to communication performed in accordance with the service flow which the mobile station 340 starts can be determined based on, for example, control data received from the wired network. If it is preferable to perform the persistent allocation of a radio resource to communication performed in accordance with the service flow which the mobile station 340 starts, then the scheduler proceeds to step S52. If it is not preferable to perform the persistent allocation of a radio resource to communication performed in accordance with the service flow which the mobile station 340 starts, then the scheduler proceeds to step S53.

(Step S52) The scheduler 171 of the base station 100 sets a DL interval and a UL interval for a service flow which the mobile station 340 starts. The scheduler 171 may determine the intervals by referring to the control data received from the wired network. The scheduler 171 then registers STID of the mobile station 340 and the set DL interval and UL interval in the schedule table 181 stored in the storage section 180.

(Step S53) The scheduler 171 of the base station 100 generates a dynamic service addition request message (DSA-REQ message). The transmission processing section 160 transmits the generated DSA-REQ message to the relay station 200 by the use of the relay link. If the scheduler 171 sets the intervals in step S52, then the DSA-REQ message transmitted includes parameters indicative of the set intervals.

(Step S54) The receiving processing section 220 of the relay station 200 receives the DSA-REQ message from the base station 100. The scheduler 261 determines whether on not the acquired DSA-REQ message includes a parameter indicative of a DL interval or a UL interval greater than 0. If a parameter indicative of a DL interval or a UL interval greater than 0 is included, then the scheduler 261 proceeds to step S55. If a parameter indicative of a DL interval or a UL interval greater than 0 is not included, then the scheduler 261 proceeds to step S56.

(Step S55) The scheduler 261 of the relay station 200 registers the STID of the mobile station 340 and the DL interval and the UL interval about which the base station 100 informs the relay station 200 in the schedule table stored in the storage section 270.

(Step S56) The scheduler 261 of the relay station 200 generates a DSA-REQ message to be transmitted by the use of the access link based on the DSA-REQ message received from the base station 100. The transmission processing section 250 transmits the generated DSA-REQ message to the mobile station 340.

(Step S57) The mobile station 340 receives the DSA-REQ message from the relay station 200. The mobile station 340 then generates a message (DSA-RSP message) of a response to the dynamic service addition request and transmits the DSA-RSP message to the relay station 200 by the use of the access link.

(Step S58) The receiving processing section 220 of the relay station 200 receives the DSA-RSP message from the mobile station 340. The scheduler 261 generates a DSA-RSP message to be transmitted by the use of the relay link based on the received DSA-RSP message. The transmission processing section 250 transmits the generated DSA-RSP message to the base station 100.

(Step S59) The receiving processing section 120 of the base station 100 receives the DSA-RSP message from the relay station 200. The scheduler 171 generates a message (DSA-ACK message) of a response to the DSA-RSP message. The transmission processing section 160 transmits the generated DSA-ACK message to the relay station 200.

(Step S60) The receiving processing section 220 of the relay station 200 receives the DSA-ACK message from the base station 100. The scheduler 261 generates a DSA-ACK message to be transmitted by the use of the access link based on the received DSA-ACK message. The transmission processing section 250 transmits the generated DSA-ACK message to the mobile station 340. As a result, service flow establishment is completed. The base station 100 and the relay station 200 apply persistent scheduling and begin to transmit user data to or receive user data from the mobile station 340.

As has been described, even if the base station 100 side requests to start a service flow, the STID of the mobile station 340, the DL interval, and the UL interval are registered in the schedule tables held by the base station 100 and the relay station 200. However, the base station 100 informs the relay station 200 about the DL interval and the UL interval as the parameters included in the DSA-REQ message.

Figure 29:
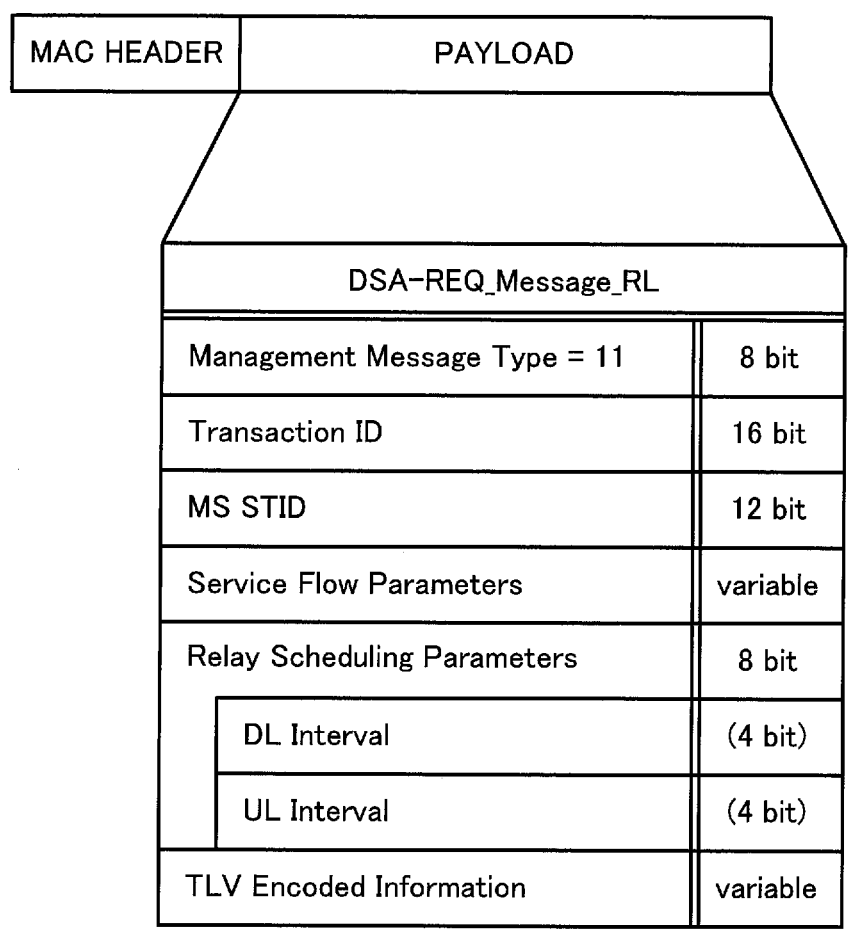
FIG. 29 is another example of the structure of a DSA-REQ message (RL).

FIG. 29 is another example of the structure of a DSA-REQ message (RL). A MAC-PDU having structure indicated in FIG. 29 is transmitted from the base station 100 to the relay station 200 in the above step S53. This MAC-PDU includes a MAC header and a payload. The contents of a DSA-REQ message (RL) are inserted into the payload.

The payload includes Management Message Type, Transaction ID, Mobile Station STID (MS STID), Service Flow Parameters, Relay Scheduling Parameters, and TLV Encoding Information.

Management Message Type is a parameter indicative of a control message type and is represented by eight bits. With a DSA-REQ message Management Message Type is set to the fixed value "11". Transaction ID is identification information for identifying transaction of a service flow establishment process, and is represented by sixteen bits. The value of Transaction ID is determined by the base station 100. Mobile Station STID is identification information for identifying a mobile station which starts a service flow, and is represented by twelve bits.

Service Flow Parameters are parameters referred to for service flow establishment and are variable-length parameters. A part or all of Service Flow Parameters may be designated by a mobile station at the other end. Relay Scheduling Parameters indicate intervals at which radio resources for the relay link are assigned, and are represented by eight bits. Relay Scheduling Parameters include a DL interval and a UL interval each of which is represented by four bits. If persistent scheduling is not performed, then Relay Scheduling Parameters are set to "0". TLV Encoding Information is other pieces of information regarding a service flow and is variable-length information.

Parameters included in control messages transmitted after that are the same with a case where the mobile station 340 side starts a service flow. The base station 100 side can request in this way to start a service flow.

By adopting the above mobile communication system according to the second embodiment, data transfers between the base station 100 and the relay station 200 can be performed efficiently. That is to say, with a service flow for which the determination that persistent scheduling is applied is made, agreement on an interval between and offsets of subframes by which MAC-PDUs are transmitted and the order of transmission in a subframe is gotten between the base station 100 and the relay station 200. Accordingly, even if the base station 100 does not describe STID of destination mobile stations in a HARQ block, the relay station 200 can identify a destination of each MAC-PDU. In addition, even if the relay station 200 does not describe STID of source mobile stations in a HARQ block, the base station 100 can identify a source of each MAC-PDU.

As a result, the consumption of radio resources for the relay link can be controlled. Furthermore, even if the base station 100 and the relay station 200 describe in a HARQ block a bit map which indicates whether or not there is user data, its length can be controlled. This is useful especially in communication, such as VoIP communication, in which a small amount of data is continuously transmitted. In addition, the above control can be applied only to a kind of communication suitable for persistent scheduling. As a result, a balance between radio resource consumption and control complexity or a processing load can be adjusted.

According to the above relay station, base station, and radio communication method, data transmitted or received by a plurality of mobile stations can be transferred efficiently.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A relay station for transferring data transmitted or received between a plurality of mobile stations and a base station, the data being transferred during respective intervals of radio frames, the relay station comprising:
   a storage section configured to store a table including a plurality of records each corresponding to one of the mobile stations, each record having a group identifier indicating to which group the corresponding mobile station belongs, the group identifier being associated with a) a value indicating during what frame intervals data is to be transferred, and b) an offset, from a reference subframe, that specifies which subframe within a frame is utilized to transfer the data; and
   a transmission processing section configured to perform data transmission toward the base station, based on the records in the table that correspond to the one or more mobile stations and that are selected according to a current frame to be transferred, when data has to be relayed from the mobile stations to the base station as well as when no data has to be relayed from the mobile stations to the base station, wherein the transmission processing section is further configured in such a way that when there is no data to be transferred for a mobile station indicated in the selected corresponding record, the transmission processing section transmits to the base station, with timing corresponding to the mobile station, header information indicating that data size is zero.

2. The relay station according to claim 1, wherein the transmission processing section is configured to transfer the data from two or more mobile stations during the same subframe in an order indicated in the corresponding selected records.

3. The relay station according to claim 2, wherein the order in which the transmission processing section transfers the data from the two or more mobile stations is determined according to an order in which the two or more mobile stations were registered in the table.

4. The relay station according to claim 1, wherein the records indicate units of retransmission control between the relay station and the base station.

5. The relay station according to claim 1, wherein a frame cycle is set at the time of an establishment of a service flow between each mobile station and the base station.

6. The relay station according to claim 1, wherein:
   an offset from a reference frame of a frame to which each record is applied is set in said each record; and
   the records are selected based on the offset.

7. The relay station according to claim 6, wherein the offset is set at the time of beginning to transmit or receive the data in accordance with a service flow established between each mobile station and the base station.

8. The relay station according to claim 1, wherein whether or not each mobile station is registered in the table is determined according to a kind of a service at the time of a service flow being established between said each mobile station and the base station.

9. The relay station according to claim 1, wherein the transmission processing section is further configured to transfer, to the base station, data received from a mobile station registered in the table without adding identification information indicative of the mobile station.

10. A relay station for transferring data transmitted or received between a plurality of mobile stations and a base station, the data being transferred during respective intervals of radio frames, the relay station comprising:
   a storage section configured to store a table including a plurality of records each corresponding to one of the mobile stations, each record having a group identifier indicating to which group the corresponding mobile station belongs, the group identifier being associated with a) a value indicating during what frame intervals data is to be transferred, and b) an offset, from a reference subframe, that specifies which subframe within a frame is utilized to transfer the data; and
   a transmission processing section configured to perform data transmission in a current frame received from the base station to one or more of the mobile stations based on records in the table that are selected according to the current frame, when data has to be relayed from the base station to the mobile stations as well as when no data has to be relayed from the base station to the mobile stations,
   wherein the transmission processing section is further configured in such a way that when there is no data to be transferred for a mobile station indicated in the selected corresponding record, the transmission processing section transmits to the base station, with timing corresponding to the mobile station, header information indicating that data size is zero.

11. A base station for transmitting data to or receiving data from a plurality of mobile stations via a relay station, the data being transferred during respective intervals of radio frames, the base station comprising:
   a storage section configured to store a table including a plurality of records each corresponding to one of the mobile stations, each record having a group identifier indicating to which group the corresponding mobile station belongs, the group identifier being associated with a) a value indicating during what frame intervals data is to be transferred, and b) an offset, from a reference subframe, that specifies which subframe within a frame is utilized to transfer the data; and
   an identification section configured to identify data transmission from each mobile station included in a current frame received from the relay station based on records in the table that are selected according to the current frame, the data transmission is performed when data has to be relayed from the mobile stations to the base station as well as when no data has to be relayed from the mobile stations to the base station,
   wherein when there is no data to be transferred for a mobile station indicated in the selected corresponding record, the relay station transmits to the base station, with timing corresponding to the mobile station, header information indicating that data size is zero.

12. A base station for transmitting data to or receiving data from a plurality of mobile stations via a relay station, the data being transferred during respective intervals of radio frames, the base station comprising:
   a storage section configured to store a table including a plurality of records each corresponding to one of the mobile stations, each record having a group identifier indicating to which group the corresponding mobile station belongs, the group identifier being associated with a) a value indicating during what frame intervals data is to be transferred, and b) an offset, from a reference subframe, that specifies which subframe within a frame is utilized to transfer the data; and
   a transmission processing section configured to perform data transmission for one or more of the mobile stations to the relay station based on records in the table that are selected according to a current frame that is to be transmitted, when data has to be relayed from the base station to the mobile stations as well as when no data has to be relayed from the base station to the mobile stations,
   wherein the transmission processing section is further configured in such a way that when there is no data to be transferred for a mobile station indicated in the selected corresponding record, the transmission processing section transmits to the base station, with timing corresponding to the mobile station, header information indicating that data size is zero.

* * * * *